(12) United States Patent
Park

(10) Patent No.: US 11,882,263 B2
(45) Date of Patent: Jan. 23, 2024

(54) TOF CAMERA

(71) Applicant: LG INNOTEK CO., LTD., Seoul (KR)

(72) Inventor: Kang Yeol Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 17/753,361

(22) PCT Filed: Aug. 28, 2020

(86) PCT No.: PCT/KR2020/011585
§ 371 (c)(1),
(2) Date: Feb. 28, 2022

(87) PCT Pub. No.: WO2021/040476
PCT Pub. Date: Mar. 4, 2021

(65) Prior Publication Data
US 2022/0329774 A1  Oct. 13, 2022

(30) Foreign Application Priority Data
Aug. 30, 2019 (KR) .................. 10-2019-0107459

(51) Int. Cl.
H04N 13/254 (2018.01)
H04N 13/296 (2018.01)
(Continued)

(52) U.S. Cl.
CPC ......... *H04N 13/254* (2018.05); *G01S 7/4815* (2013.01); *G01S 7/4865* (2013.01); *G01S 17/894* (2020.01); *H04N 13/296* (2018.05)

(58) Field of Classification Search
CPC .. H04N 13/254; H04N 13/296; H04N 13/271; H04N 23/55; H04N 23/56;
(Continued)

(56) References Cited

U.S. PATENT DOCUMENTS 7,933,077 B1* 4/2011 Tsai .................. G02B 13/04
                                                    359/753
11,132,805 B2* 9/2021 Hall .................. G01S 17/32
(Continued)

FOREIGN PATENT DOCUMENTS

EP  3 451 023 A1   3/2019
JP  2016-95460 A   5/2016
(Continued)

OTHER PUBLICATIONS

International Search Report dated Nov. 27, 2020 in International Application No. PCT/KR2020/011585.
(Continued)

*Primary Examiner* — Jared Walker
(74) *Attorney, Agent, or Firm* — Saliwanchik, Lloyd & Eisenschenk

(57) ABSTRACT

A time of flight (ToF) camera according to embodiments of the present invention includes a light source unit including an infrared light-emitting device array and configured to generate a light signal; a lens unit disposed on the light source unit and including a plurality of lenses; and an adjustment unit configured to adjust the lens unit such that a light pattern of the light signal, which has passed through the lens unit, becomes a surface lighting or a spot lighting including a plurality of spot patterns, wherein the lens unit has a distortion aberration in the form of barrel distortion in which irradiance of the light pattern decreases in a direction away from a central portion.

14 Claims, 16 Drawing Sheets

(51) Int. Cl.
*G01S 17/894* (2020.01)
*G01S 7/481* (2006.01)
*G01S 7/4865* (2020.01)

(58) Field of Classification Search
CPC ... H04N 13/246; G01S 7/4815; G01S 7/4865; G01S 17/894; G02B 9/34; G02B 3/0087; G02B 3/14; G02B 27/0927; G02B 3/12; G02B 7/04
See application file for complete search history.

(56) References Cited

U.S. PATENT DOCUMENTS

| | | | | |
|---|---|---|---|---|
| 2014/0049609 | A1* | 2/2014 | Wilson | H04N 13/271 348/46 |
| 2014/0313519 | A1* | 10/2014 | Shpunt | G01S 17/89 356/612 |
| 2016/0349370 | A1* | 12/2016 | Lee | H04N 23/745 |
| 2018/0298283 | A1* | 10/2018 | Ohishi | C09K 19/322 |
| 2019/0251699 | A1* | 8/2019 | Chih | G06V 20/10 |

FOREIGN PATENT DOCUMENTS

| KR | 10-2015-0090680 A | 8/2015 |
|---|---|---|
| KR | 10-2016-0108076 A | 9/2016 |
| KR | 10-2017-0005649 A | 1/2017 |
| KR | 10-2019-0000052 A | 1/2019 |

OTHER PUBLICATIONS

Office Action dated May 31, 2023 in Chinese Application No. 202080061171.9.

Supplementary European Search Report dated Aug. 25, 2022 in European Application No. 20858087.8.

\* cited by examiner (a)          (b)

(a)          (b)

(a)      (b)

Fig.10
(a)
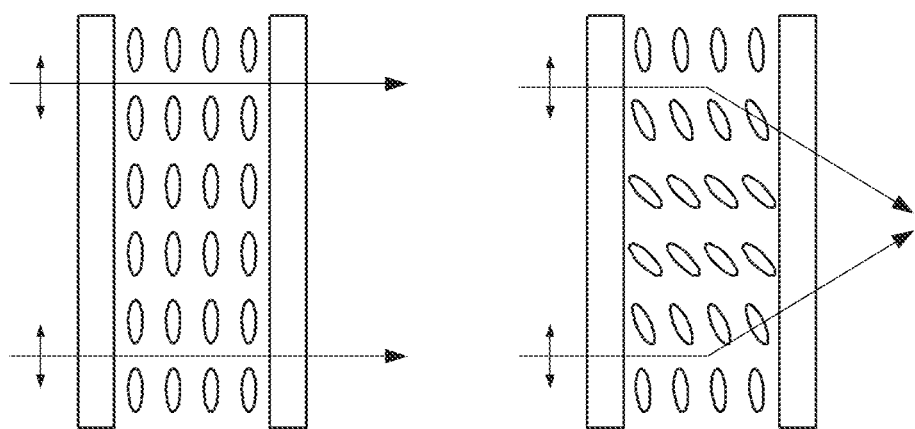
(b)
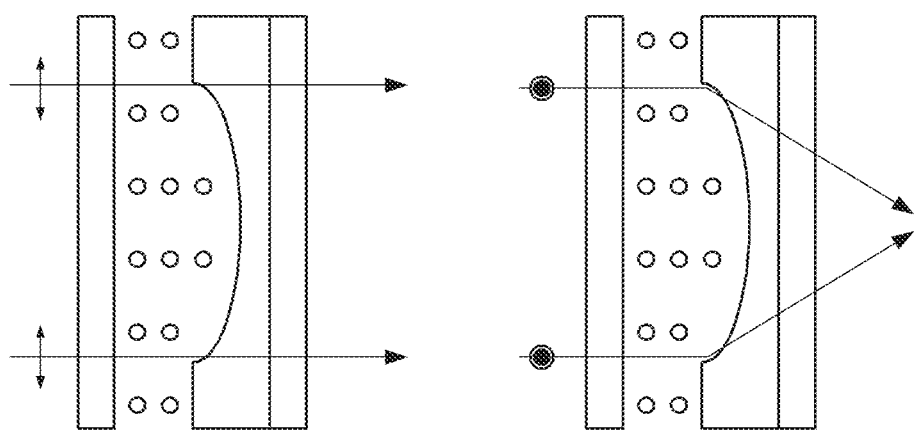

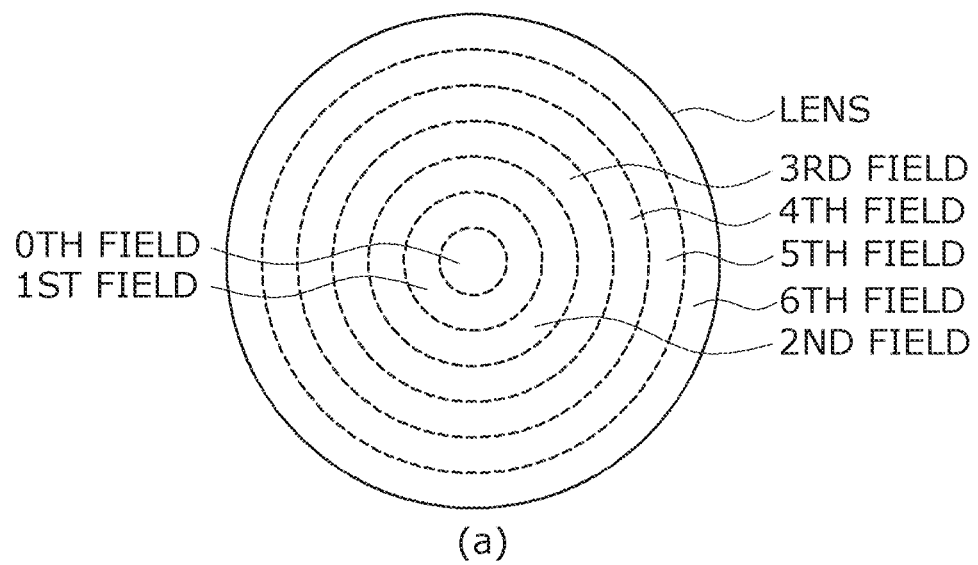
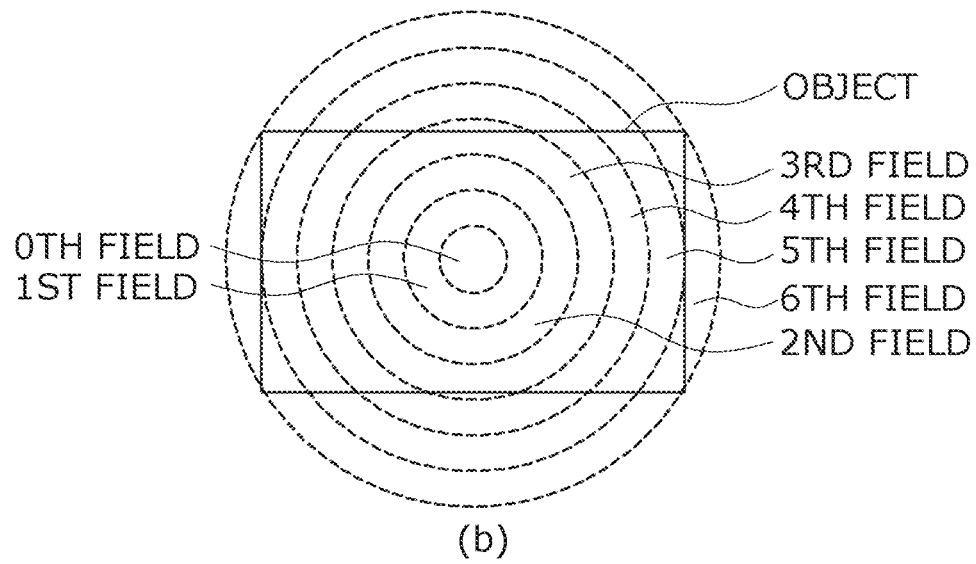

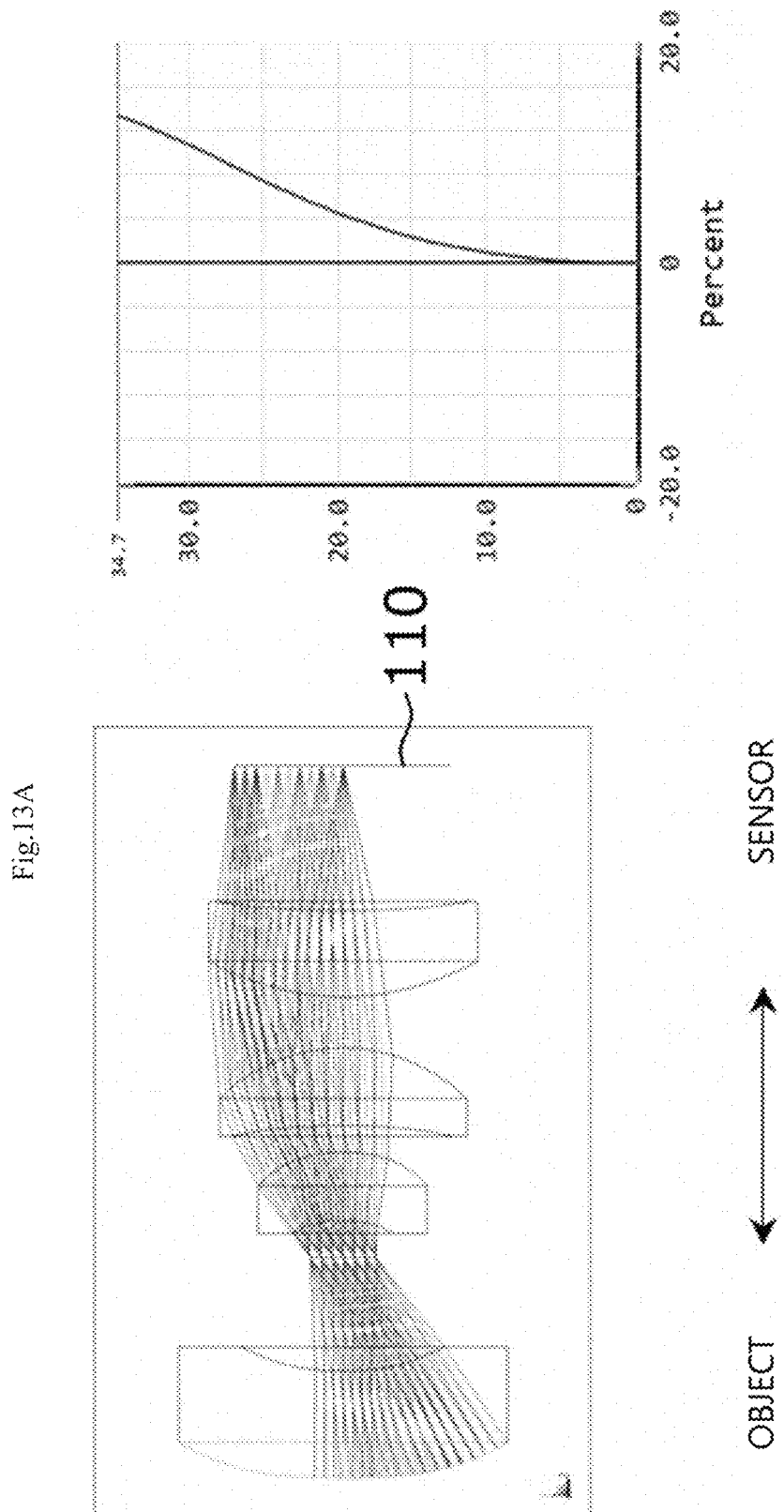

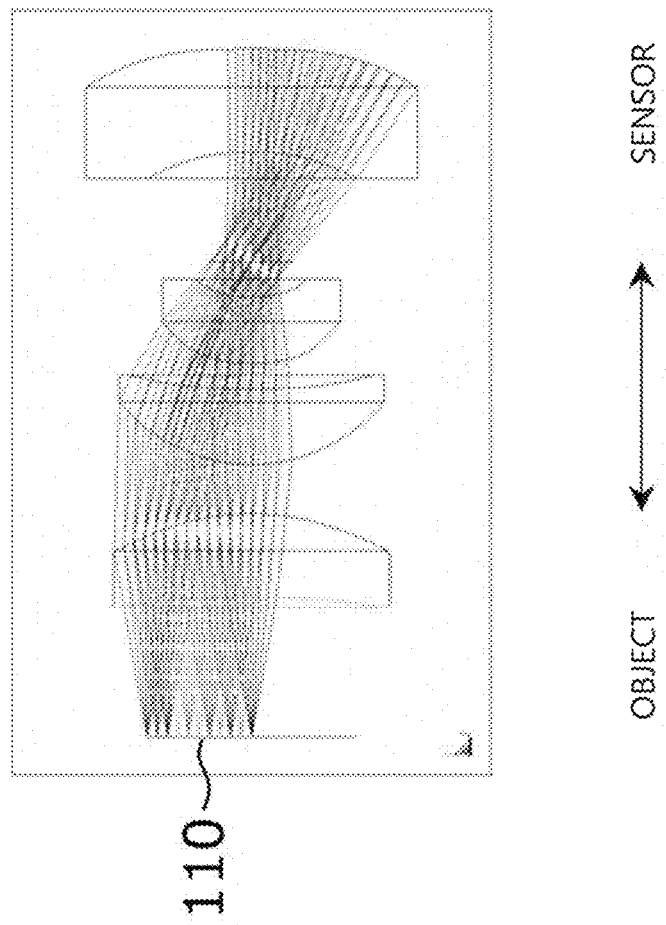
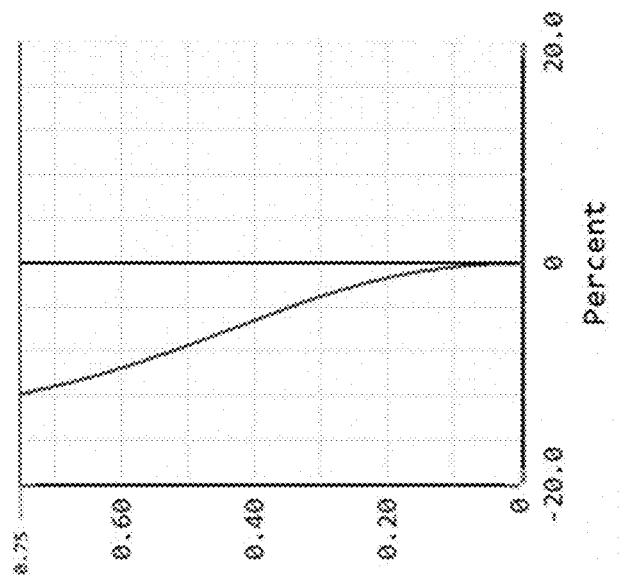
Fig. 13B

TOF CAMERA

CROSS-REFERENCE TO RELATED APPLICATIONS

This application is the U.S. national stage application of International Patent Application No. PCT/KR2020/011585, filed Aug. 28, 2020, which claims the benefit under 35 U.S.C. § 119 of Korean Application No. 10-2019-0107459, filed Aug. 30, 2019, the disclosures of each of which are incorporated herein by reference in their entirety.

TECHNICAL FIELD

Embodiments relate to a time of flight (ToF) camera.

BACKGROUND ART

Three-dimensional (3D) contents have been applied to not only games and cultural fields but also a variety of fields such as education, manufacturing, autonomous driving, and the like, and a depth map is necessary for obtaining 3D contents. The depth map is information indicating a distance on space and indicates perspective information of another point with respect to one point in a two-dimensional (2D) image. As a method of obtaining the depth map, a method of projecting infrared (IR) structured light toward an object, a method using a stereo camera, a time of flight (ToF) method, and the like have been used.

In the case of the ToF method or the structured light method, light in an IR wavelength region has been used. Recently, there have been attempts to use features of the IR wavelength region in biometric authentication. For example, it is known that a shape of veins spreading in a finger and the like does not change during one's lifetime from a fetal stage and is different for every person. Accordingly, a venous pattern may be identified using a camera device with an IR light source mounted thereon. To this end, each finger may be detected by capturing an image of a finger and removing a background on the basis of a shape and color of the finger, and a venous pattern of each finger may be extracted from color information of the detected finger. That is, an average color of the finger, color of veins distributed in the finger, and color of wrinkles of the finger may be different from each other. For example, the color of veins distributed in the finger may be weaker in red than the average color of the finger, and the color of wrinkles of the finger may be darker in comparison to the average color of the finger. An approximate value of veins may be calculated for each pixel using the above features, and a venous pattern may be extracted using the calculated result. In addition, an individual may be identified by comparing the extracted venous pattern of each finger with pre-registered data.

However, in the case of a conventional ToF camera, light of the same intensity and magnitude is output regardless of a situation such as the distance to an object or the size of the object. Accordingly, a problem may occur in that an image is not obtained due to the occurrence of a light saturation phenomenon, or an inaccurate image is generated because sufficient information is not obtained. In addition, since the same pattern of light is always used, there are problems in that the camera may not be driven adaptively according to capturing purposes, and power consumption may not be efficiently controlled. Also, the information on a peripheral portion may be lost at a receiving end when reflected light is received, and thus there is a problem in that the reliability of data may be lowered.

DISCLOSURE

Technical Problem

An embodiment is directed to providing a time of flight (ToF) camera that may be adaptively driven according to capturing purposes.

An embodiment is also directed to providing a ToF camera capable of efficiently controlling power consumption.

An embodiment is also directed to providing a ToF camera capable of obtaining high-reliability data.

Problems to be solved in the embodiments are not limited to the above-described problems, and objects and effects which can be determined from the solutions and the embodiments of the problems described below are also included.

Technical Solution

One aspect of the present invention provides a time of flight (ToF) camera including a light source unit including an infrared light-emitting device array and configured to generate a light signal; a lens unit disposed on the light source unit and including a plurality of lenses; and an adjustment unit configured to adjust the lens unit such that a light pattern of the light signal, which has passed through the lens unit, becomes a surface lighting or a spot lighting including a plurality of spot patterns, wherein the lens unit has a distortion aberration in the form of barrel distortion in which irradiance of the light pattern decreases in a direction away from a central portion.

The adjustment unit may adjust the light pattern of the light signal by changing a light path of the light signal.

The adjustment unit may include a driving member and move the lens unit using the driving member to change a distance between the light source unit and the lens unit.

When a back focus of the lens unit is away from the light source unit, the light pattern of the light signal may become the surface lighting, and when the back focus of the lens unit is closer to the light source unit, the light pattern of the light signal may become the spot lighting.

The adjustment unit may include an optical member configured to change a refractive index and change the refractive index according to a signal applied to the optical member.

The lens unit may have an effective focal length greater than or equal to 0.4 mm and less than or equal to 2 mm.

The distortion aberration may have signs corresponding to those of the barrel distortion and have a magnitude of a distortion rate of 5% or more and 20% or less at a half-angle point of a viewing angle of the lens unit.

A magnitude of a distortion rate monotonically may increase from a central portion of the lens unit to a half-angle point of a viewing angle of the lens unit for each field.

The distortion aberration may have a magnitude of a distortion rate not more than 1% at a point of $1/7$ of a viewing angle of the lens unit.

The distortion aberration may have a magnitude of a distortion rate of 4% or more and 10% or less at a point of $2/7$ of a viewing angle of the lens unit.

The distortion aberration may have a magnitude of a distortion rate of 10% or more and 20% or less at a point of $3/7$ of a viewing angle of the lens unit.

The distortion aberration may have a magnitude of a distortion rate of 13% or more and 20% or less at a half-angle point of a viewing angle of the lens unit.

A viewing angle of the lens unit may have one value between 69° to 80°.

The light source unit may drive at least one of a plurality of light-emitting devices according to a plurality of driving modes set to correspond to different spot densities.

Advantageous Effects

According to embodiments, power consumption efficiency can be increased.

Further, a time of flight (ToF) camera can be adaptively driven according to capturing purposes.

In addition, the accuracy and reliability of a capturing image can be improved.

Various advantages and effects of the present invention are not limited to the above description and can be more easily understood during the description of specific embodiments of the present invention.

DESCRIPTION OF DRAWINGS

FIG. 9 and FIGS. 10A and 10B are views for describing a refractive index lens according to the embodiment of the present invention.

FIGS. 12A and 12B are views for describing the lens unit to which distortion aberration is applied according to the embodiment of the present invention.

FIGS. 13A and 13B are diagrams for describing signs of the distortion aberration according to the embodiment of the present invention.

FIGS. 14A to 15B are diagrams illustrating simulation results of a surface lighting according to the embodiment of the present invention.

MODES OF THE INVENTION

Figure 1:
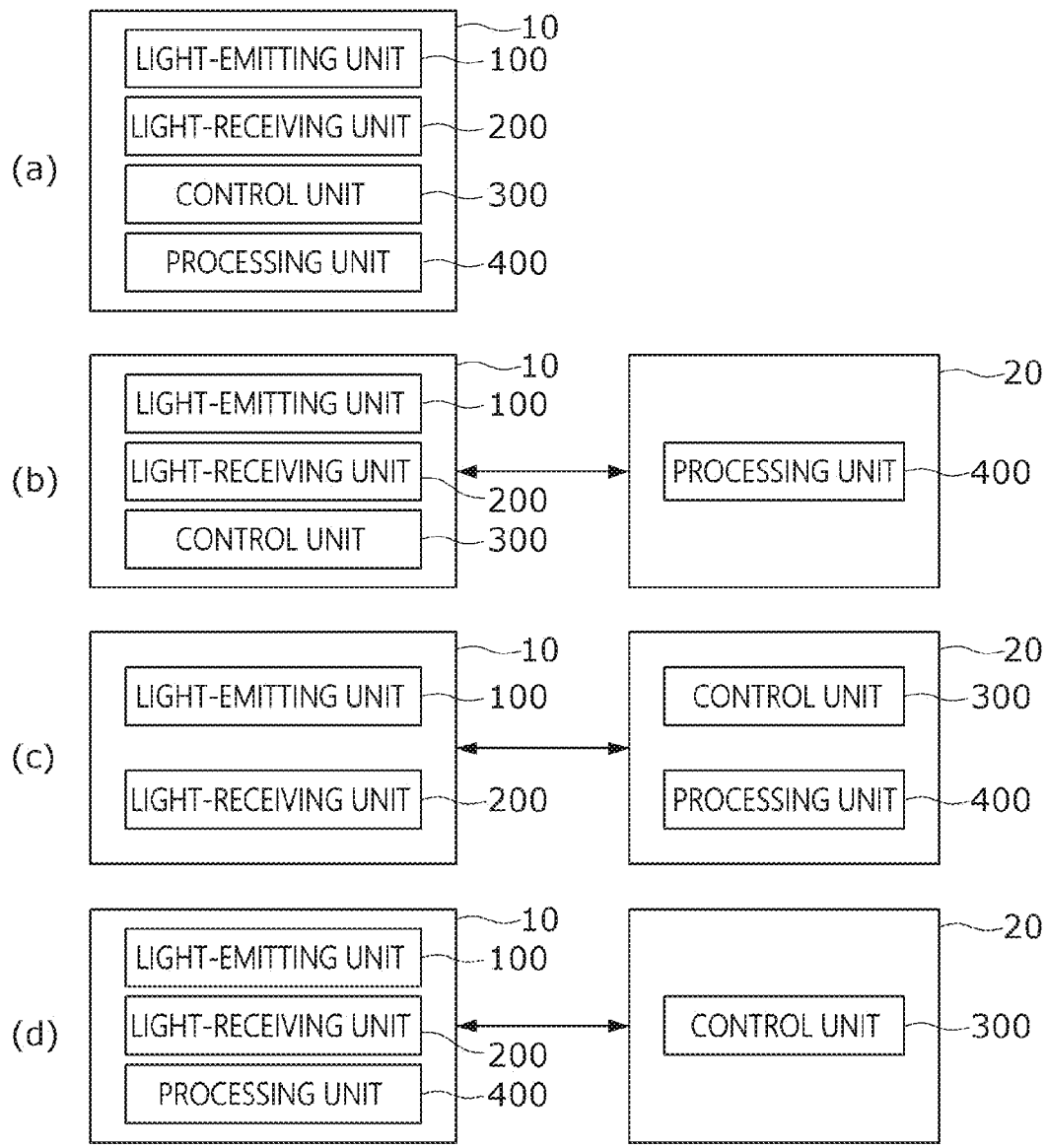
FIGS. 1A to 1D are diagrams each illustrating a configuration example of a camera module according to an embodiment of the present invention.

Hereinafter, exemplary embodiments of the present invention will be described in detail with reference to the accompanying drawings.

However, the technical spirit of the present invention is not limited to embodiments to be disclosed below but may be realized in many different forms, and one or more elements of each of the embodiments may be selectively combined and substituted within the scope of the present invention.

In addition, unless clearly and expressly defined herein, the terms (including technical and scientific terms) used in the embodiments of the present invention have the same meaning as commonly understood by one of ordinary skill in the art to which the present invention belongs. It should be further understood that terms, such as those defined in commonly used dictionaries, should be interpreted as having a meaning that is consistent with their meaning in the context of the related art.

Further, the terms used in the embodiments of the present invention are provided only to describe embodiments of the present invention and not for purposes of limitation.

In the present specification, the singular forms include the plural forms unless the context clearly indicates otherwise, and the phrase "at least one element (or one or more elements) of an element A, an element B, and an element C," should be understood as including the meaning of at least one of all combinations obtained by combining the element A, the element B, and the element C.

Further, in describing elements of the embodiments of the present invention, the terms such as first, second, A, B, (a), (b), and the like may be used.

These terms are merely for distinguishing one element from another element, and the property, order, sequence, and the like of corresponding elements are not limited by the terms.

In addition, it will be understood that when one element is referred to as being "connected" or "coupled" to another element, the element may not only be directly connected or coupled to another element but may also be connected or coupled to another element through the other element presented between one element and another element.

Further, when one element is referred to as being formed or disposed "on (above)" or "under (below)" another element, the terms "on (above)" or "under (below)" include both of a case in which the two elements are in direct contact with each other or a case in which one or more elements are (indirectly) formed or disposed between the two elements. In addition, the term "on (above)" or "under (below)" includes a case in which another element is disposed in an upward direction or a downward direction with respect to one element.

A camera module 10 according to an embodiment of the present invention may refer to a camera or a camera device that extracts a depth map using a time of flight (ToF) function. Accordingly, the camera module 10 may be used interchangeably with a ToF camera device, a ToF camera module 10, and a ToF camera.

FIGS. 1A to 1D are diagrams each illustrating a configuration example of a camera module according to an embodiment of the present invention.

As illustrated in FIG. 1, the camera module 10 according to the embodiment of the present invention may include a light-emitting unit 100 and a light-receiving unit 200, and may further include a control unit 300 and a processing unit 400.

The light-emitting unit 100 may be a unit that generates a light signal and then outputs the generated light signal to an object. To this end, the light-emitting unit 100 may include components capable of generating light, such as light-emitting devices, and components capable of modulating the light. The light signal may have a pulse wave form or a continuous wave form. The continuous wave form may be a sine wave form or a square wave form.

Further, the light-emitting unit 100 may output the light signal by distorting a light path thereof. The light path of the light signal may be distorted according to preset distortion aberration.

Further, the light-emitting unit 100 may output a light signal of various light patterns. The light-emitting unit 100 may output a light signal of a surface lighting or a light signal of a spot lighting. The light-emitting unit 100 may include a structure capable of changing the light path of the light signal according to a control signal.

In addition, the light-emitting unit 100 may output the light signal to various irradiation regions. The light-emitting unit 100 may output the light signal to the various irradiation regions by driving light-emitting device arrays for each region. The light-emitting unit 100 may include the light-emitting device arrays to change the irradiation regions according to a control signal.

The light-receiving unit 200 may detect light reflected by the object. The light-receiving unit 200 may detect the light signal reflected by the object. At this point, the detected light signal may be the light signal output from the light-emitting unit 100 and reflected by the object. The light-receiving unit 200 may include a lens assembly, a filter, and a sensor to detect the light signal.

The light signal reflected by the object may pass through the lens assembly. An optical axis of the lens assembly may be aligned with an optical axis of the sensor. The filter may be disposed between the lens assembly and the sensor. The filter may be disposed on a light path between the object and the sensor. The filter may filter light having a predetermined wavelength range. The filter may transmit light of a specific wavelength band. The filter may allow light of a specific wavelength to pass. For example, the filter may allow light of a wavelength band of the light signal output by the light-emitting unit 100 to pass. The filter may allow light of an infrared (IR) band to pass and block light other than the IR band. Alternatively, the filter may allow visible light to pass and block light of wavelengths other than that of the visible light. The sensor may sense light. The sensor may receive the light signal. The sensor may be an image sensor that senses the light signal. The sensor may detect the light signal and output the light signal as an electrical signal. The sensor may detect light of a wavelength corresponding to a wavelength of light output from the light-emitting device. The sensor may detect light of an IR band. Alternatively, the sensor may detect light of a visible light band. The sensor may include a pixel array configured to convert light passing through the lens assembly into an electrical signal corresponding to the light, a driving circuit configured to drive a plurality of pixels included in the pixel array, and a readout circuit configured to read an analog pixel signal of each pixel. The readout circuit may compare the analog pixel signal to a reference signal and generate a digital pixel signal (or an image signal) through analog-digital conversion. Here, a digital pixel signal of each pixel included in the pixel array constitutes an image signal, and the image signal may be defined as an image frame since the image signal is transmitted in units of frames. That is, the image sensor may output a plurality of image frames.

The light-receiving unit 200 may be disposed parallel to the light-emitting unit 100. The light-receiving unit 200 may be disposed beside the light-emitting unit 100. The light-receiving unit 200 may be disposed in the same direction as the light-emitting unit 100.

The control unit 300 may control the driving of at least one of the light-emitting unit 100 and the light-receiving unit 200. As one example, the control unit 300 may generate a control signal and control the driving of the light-emitting devices of the light-emitting unit 100 using the generated control signal. As another example, the control unit 300 may generate a control signal and control the changing of the light path of the light signal using the generated control signal.

The control unit 300 may be included in the camera module 10 as illustrated in FIGS. 1A and 1B. For example, the control unit 300 may be implemented in a form coupled to a substrate of the camera module 10. As another example, the control unit 300 may be included in a terminal 20, in which the camera module 10 is disposed, as illustrated in FIGS. 1C and 1D. For example, the processing unit 400 may be implemented in the form of an application processor (AP) of a smartphone in which the camera module 10 is mounted.

The processing unit 400 may generate an image based on an electrical signal generated by the light-receiving unit 200. The processing unit 400 may generate a sub-frame image from the electrical signal generated every phase pulse period. The processing unit 400 may generate one frame image from a plurality of sub-frame images generated during a frame pulse period. In addition, the processing unit 400 may generate one high-resolution image through the plurality of sub-frame images or a plurality of frame images. For example, the processing unit 400 may generate the high-resolution image using a super resolution (SR) technique.

The processing unit 400 may be included in the camera module 10 as illustrated in FIGS. 1A and 1D. For example, the processing unit 400 may be implemented in a form coupled to the sensor included in the light-receiving unit 200. As another example, the processing unit 400 may be implemented in a form coupled to the substrate on which the light-emitting unit 100 and the light-receiving unit 200 are disposed. As another example, the processing unit 400 may be included in the terminal 20, in which the camera module 10 is disposed, as illustrated in FIGS. 1B and 1C. For example, when the camera module 10 is disposed in a smartphone, the processing unit 400 may be implemented in the form of an AP of the smartphone.

Figure 2:
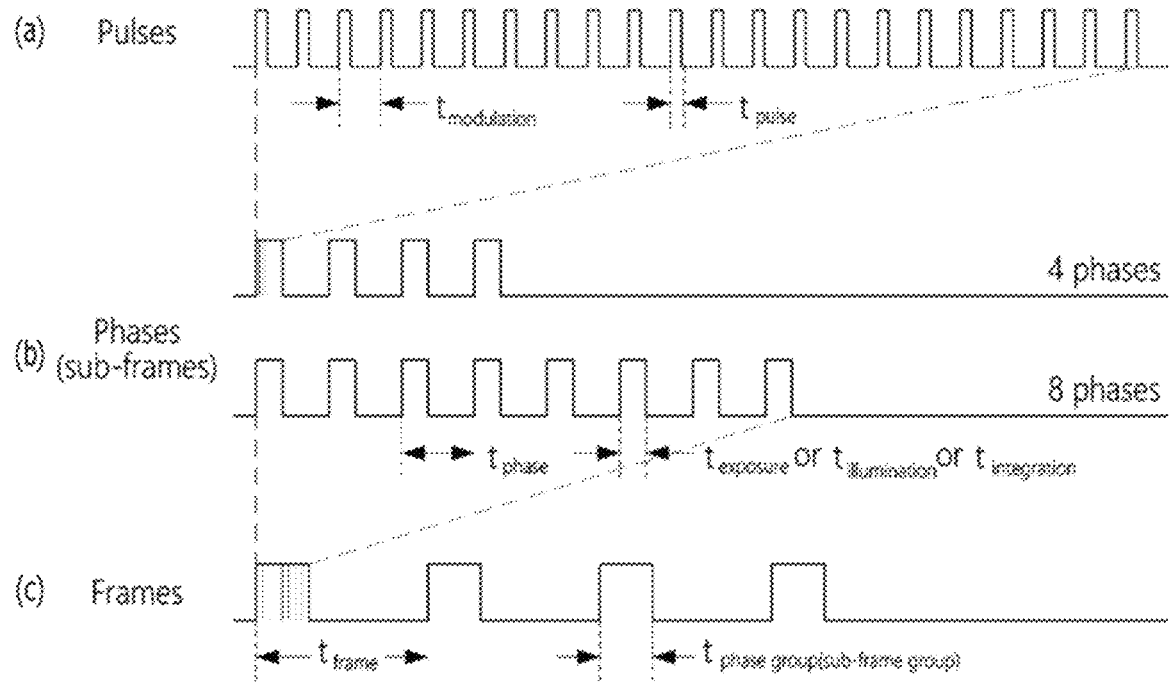
FIGS. 2A to 2C are diagrams for describing a light signal generated by a light-emitting unit according to the embodiment of the present invention.

FIGS. 2A to 2C are diagrams for describing the light signal generated by the light-emitting unit according to the embodiment of the present invention.

As illustrated in FIG. 2A, the light-emitting unit 100 may generate a light pulse at a predetermined period. The light-emitting unit 100 may generate the light pulse, which has a predetermined pulse width $t_{pulse}$, at a predetermined pulse repetition period $t_{modulation}$.

As illustrated in FIG. 2B, the light-emitting unit 100 may generate one phase pulse by grouping a predetermined number of light pulses. The light-emitting unit 100 may generate the phase pulse having a predetermined phase pulse period $t_{phase}$ and a predetermined phase pulse phase width $t_{exposure}$, $t_{illumination}$, or $t_{integration}$. Here, one phase pulse period $t_{phase}$ may correspond to one sub-frame. The sub-frame may be referred to as a phase frame. A predetermined number of phase pulse periods may be grouped. A method in which four phase pulse periods $t_{phase}$ are grouped may be referred to as a 4-phase method. A method in which eight phase pulse periods $t_{phase}$ are grouped may be referred to as an 8-phase method.

As illustrated in FIG. 2C, the light-emitting unit 100 may generate one frame pulse by grouping a predetermined number of phase pulses. The light-emitting unit 100 may generate the frame pulse having a predetermined frame pulse period $t_{frame}$ and a predetermined frame pulse width $t_{phase\ group\ (sub\text{-}frame\ group)}$. Here, one frame pulse period $t_{frame}$ may correspond to one frame. Thus, when the object is captured at ten frames per second (FPS), ten frame pulse periods $t_{frame}$ may be repeated in one second. In the 4-phase method, four sub-frames may be included in one frame. That is, one frame may be generated through four sub-frames. In the 8-phase method, eight sub-frames may be included in one frame. That is, one frame may be generated through eight sub-frames.

Although the terms "light pulse," "phase pulse," and "frame pulse" are used for the description above, the present invention is not limited thereto.

Figure 3:
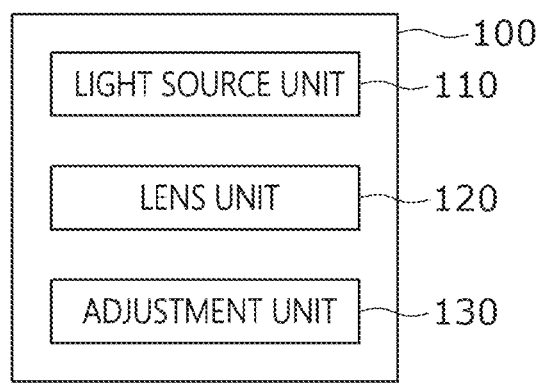
FIG. 3 is a configuration diagram of the light-emitting unit according to the embodiment of the present invention.
Figure 4:
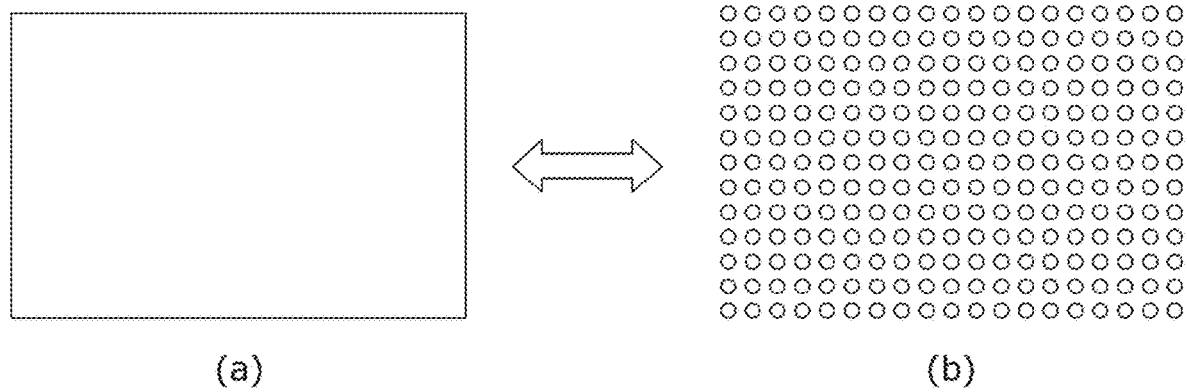
FIGS. 4A and 4B are views for describing the adjustment of a light pattern according to the embodiment of the present invention.

FIG. 3 is a configuration diagram of the light-emitting unit according to the embodiment of the present invention.

As illustrated in FIG. 3, the light-emitting unit 100 according to the embodiment of the present invention may include a light source unit 110, a lens unit 120, and an adjustment unit 130.

The light source unit 110 may include a plurality of light-emitting devices arranged therein according to a predetermined rule and may generate a light signal. The light source unit 110 may drive at least one of the plurality of light-emitting devices according to a plurality of driving modes set to correspond to different spot densities. To this end, the light-emitting devices may be disposed in the light source unit 110 according to the predetermined rule and may be electrically connected to each other.

First, when the arrangement of the light-emitting devices is described, the light-emitting devices may be disposed on a plurality of lines including first to third lines. In this case, the second line may be disposed between the first line and the third line, and the first to third lines may be repeatedly disposed.

Next, the connection of the light-emitting devices will be described. As one example, each line of the first to third lines may be electrically connected to a plurality of light-emitting devices. In this case, the plurality of driving modes may include at least one among a first driving mode for driving a plurality of light-emitting devices disposed on the first line, the second line, and the third line, a second driving mode for driving a plurality of light-emitting devices disposed on the first line and the third line, and a third driving mode for driving a plurality of light-emitting devices disposed on the first line. As another example, light-emitting devices adjacent to each other among the plurality of light-emitting devices disposed on the first line may be respectively connected to a first electrode and a second electrode, and the plurality of light-emitting devices disposed on the second line may be connected to a third electrode, and light-emitting devices adjacent to each other among the plurality of light-emitting devices disposed on the third line may be respectively connected to a fourth electrode and a fifth electrode. In this case, the plurality of driving modes may include at least one among a fourth driving mode for driving a plurality of light-emitting devices connected to the first to fifth electrodes, a fifth driving mode for driving a plurality of light-emitting devices connected to the first, second, fourth, and fifth electrodes, a sixth driving mode for driving a plurality of light-emitting devices connected to the first and second electrodes, a seventh driving mode for driving a plurality of light-emitting devices connected to the first and fourth electrodes or the second and fifth electrodes, and an eighth driving mode for driving a plurality of light-emitting devices connected to one of the first, second, fourth, and fifth electrodes.

The light source unit 110 may drive light-emitting devices disposed in a partial region of an entire region in which the plurality of light-emitting devices are disposed. As one example, the light source unit 110 may drive a plurality of light-emitting devices disposed within a predetermined distance from the center. As another example, the light source unit 110 may be divided into a plurality of areas and may drive a plurality of light-emitting devices disposed in at least one area of the plurality of areas.

The lens unit 120 may distort the light path of the light signal according to a preset distortion aberration and output the light signal. In the lens unit 120, the preset distortion aberration may be applied for each set field.

Here, the distortion aberration may have signs corresponding to those of barrel distortion and have a magnitude of a distortion rate of 5% or more and 20% or less at a half-angle point of a viewing angle of the lens unit 120, and the magnitude of the distortion rate may monotonically increase from a central portion of the lens unit 120 to the half-angle point of the viewing angle of the lens unit 120 for each field. According to one embodiment, the viewing angle of the lens unit 120 may have one value between 69° and 80°. For example, the lens unit 120 may have a viewing angle of 70°.

A light pattern may be generated in the form of the barrel distortion corresponding to the distortion aberration. The light pattern may increase in irradiance as it moves away from a central portion thereof.

The lens unit 120 may have an effective focal length (EFL) greater than or equal to 0.4 mm and less than or equal to 2 mm.

The lens unit 120 may include at least one lens. The lens unit 120 may be composed of a plurality of lenses. Spaced distances between the plurality of lenses may be fixed. The plurality of lenses may be moved together by a driving member. Accordingly, even when the plurality of lenses are moved by the driving member, the spaced distances between the lenses may be maintained.

The adjustment unit 130 may adjust the light pattern of the light signal irradiated on the object to be a surface lighting or a spot lighting including a plurality of spots. The adjustment unit 130 may adjust the light pattern of the light signal as the surface lighting or the spot lighting by changing the light path of the light signal. The surface lighting may be used when the object is located at a small distance from the camera module. The spot lighting may be used when the object is located at a great distance from the camera module. This is because the intensity of light of the spot lighting is greater than that of the surface lighting and thus the amount of light received by the light-receiving unit is great, so that the distance of the object may be accurately measured.

The adjustment unit 130 may include a driving member or an optical member to adjust the light pattern. According to one embodiment, the driving member may be coupled to the lens unit 120. The driving member may be coupled to the entire lens unit 120 or to some components (e.g., a lenslet) included in the lens unit 120. The adjustment unit 130 may change a distance between the light source unit 110 and the lens unit 120 by moving the lens unit 120 using the driving member. The light path of the light signal may be changed according to the distance between the light source unit 110 and the lens unit 120. For example, the driving member may be an actuator. The actuator may be coupled to the lens unit 120. The adjustment unit 130 may change the distance between the light source unit 110 and the lens unit 120 by driving the actuator to move the lens unit 120. The light path of the light signal may be changed ac cording to the distance between the light source unit 110 and the lens unit 120.

According to another embodiment, the optical member may be coupled to the lens unit 120. The optical member may be coupled to the lens unit 120 in an add-in or add-on shape. The optical member may change a refractive index. The adjustment unit 130 may change the refractive index according to a signal applied to the optical member. The light path of the light signal may be changed according to the changed refractive index. For example, the optical member may be a liquid lens. In the liquid lens, a curvature of an interface of two liquids may be changed according to the applied signal, and the refractive index may be changed according to the curvature of the interface. Accordingly, the light path of the light signal may be changed according to the curvature of the interface.

Hereinafter, the configuration of adjusting the light pattern according to the embodiment of the present invention will be described in detail with reference to FIGS. 4 to 9.

FIGS. 4A and 4B are views for describing the adjustment of the light pattern according to the embodiment of the present invention.

FIGS. 4A and 4B each illustrate the light pattern of the light signal irradiated on the object.

Referring to FIGS. 4A and 4B, the camera module 10 according to the embodiment of the present invention may adjust the light pattern of the light signal irradiated on the object. According to the embodiment of the present invention, the light pattern may be classified into a surface light source pattern and a point light source pattern. The surface light source pattern may refer to a pattern in which light is uniformly spread over space, as shown in FIG. 4A. As shown in FIG. 4B, the point light source pattern may refer to a pattern in which light is focused locally on space. The adjustment unit 130 may adjust the light pattern such that the light signal is irradiated on the object according to one of the surface light source pattern and the point light source pattern.

As described with reference to FIG. 3, the adjustment unit 130 may include the driving member or the optical member to adjust the light pattern. For example, the driving member may be an actuator. The actuator may include a voice coil motor (VCM), a micro electro-mechanical systems (MEMS), and a piezo electric or shape memory alloy (SMA)-based actuator. As another example, the optical member may be a liquid lens or a tunable refractive index lens. The liquid lens may be a lens based on electrowetting or a shape changing polymer. The tunable refractive index lens may be a liquid crystal lens or an acoustic lens. Hereinafter, embodiments of the driving member and the optical member will be described with reference to the drawings.

FIGS. 5A and 5B are views for describing the driving member according to the embodiment of the present invention.

As described above, the adjustment unit 130 may include the driving member coupled to the lens unit. The adjustment unit 130 may change the distance between the light source unit and the lens unit by moving the lens unit using the driving member. Accordingly, the adjustment unit 130 illustrated in FIG. 5 may be a driving member.

Figure 5:
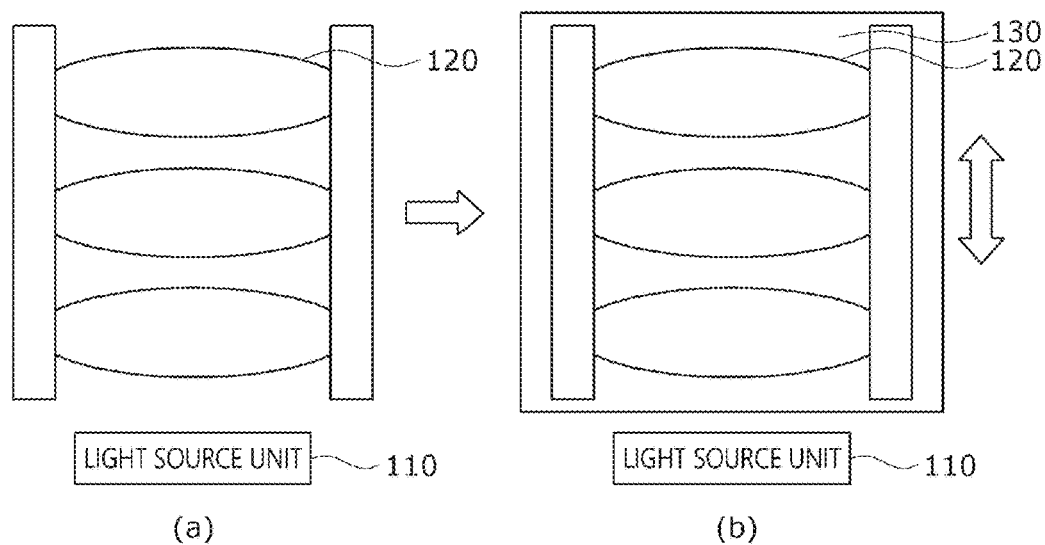
FIGS. 5A and 5B are views for describing a driving member according to the embodiment of the present invention.

Referring to FIG. 5, the lens unit 120 may be disposed to be spaced apart from the light source unit 110. The lens unit 120 may include at least one lens and a housing. That is, the lens unit 120 may be composed of one lens or may be composed of two or more lenses. The housing may be a frame that is capable of accommodating at least one lens.

According to the embodiment of the present invention, the driving member may be coupled to the lens unit 120 as shown in FIG. 5B. For example, the driving member may be coupled to the housing included in the lens unit 120. Although not illustrated in FIG. 5, according to another embodiment of the present invention, the driving member may be coupled to at least one lens. In this case, the housing may be formed in a structure in which the at least one lens may be moved by the driving member. Here, the lens unit 120 may move along an optical axis formed by the lens unit 120 and the light source unit 110.

In the absence of the driving member as shown in FIG. 5A, the lens unit 120 and the light source unit 110 are disposed to be spaced apart from each other by a fixed spaced distance, and the fixed spaced distance is not changed. However, when the driving member is included as shown in FIG. 5B, the driving member may change a spaced distance between the lens unit 120 and the light source unit 110. As the driving member changes the spaced distance between the lens unit 120 and the light-emitting unit 100, the light pattern of the light signal irradiated on the object may be changed. For example, as the spaced distance between the light source unit 110 and the lens unit 120 decreases, the light pattern may be similar to the surface light source pattern. As the spaced distance between the light source unit 110 and the lens unit 120 increases, the light pattern may be similar to the point light source pattern.

FIGS. 6A and 6B are views for describing an arrangement structure of the optical member according to the embodiment of the present invention.

As described above, the adjustment unit 130 may include the optical member capable of changing a refractive index. Accordingly, the adjustment unit 130 illustrated in FIG. 5 may be an optical member.

According to one embodiment of the present invention, as shown in FIG. 6A, the optical member may be coupled to the lens unit 120 in an add-on shape. The optical member may be coupled to an upper end of the lens unit 120 in an add-on shape. Here, the upper end of the lens unit 120 refers to one surface of the lens unit 120 through which the light signal is output. Although not illustrated in FIG. 6A, the optical member may be coupled to a lower end of the lens unit 120 in an add-on shape. Here, the lower end of the lens unit 120 refers to one surface of the lens unit 120 through which the light signal is input.

According to another embodiment of the present invention, as shown in FIG. 6B, the optical member may be coupled to the lens unit 120 in an add-in shape. Since the lens unit 120 may include at least one lens as described above, the lens unit 120 may include two or more lenses. At this point, the optical member may be coupled between lenses in an add-in shape.

Figure 6:
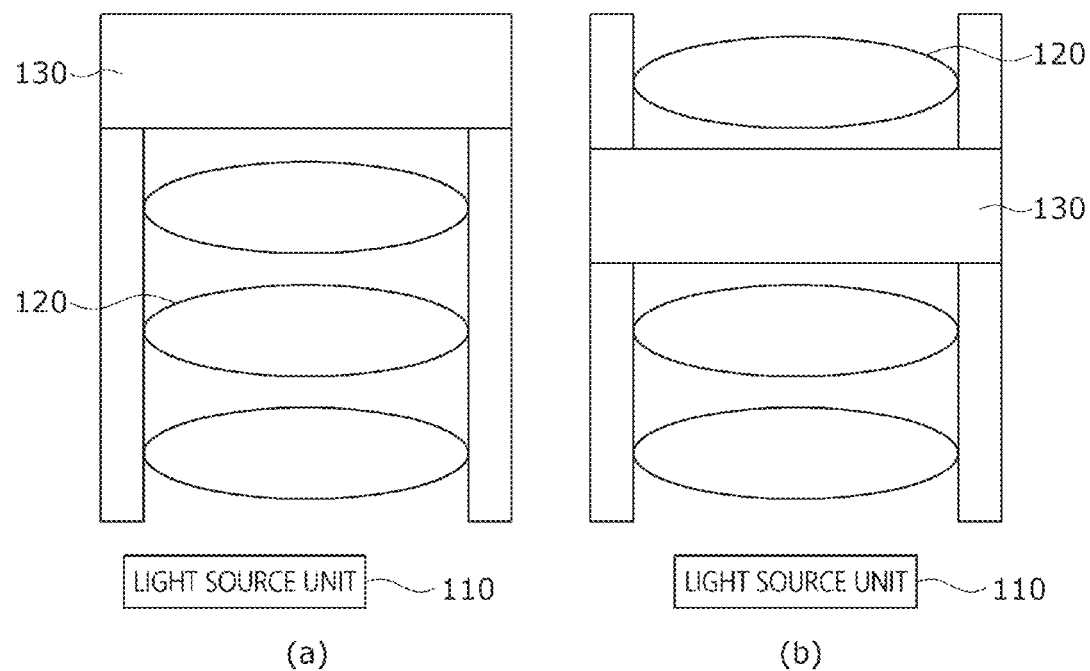
FIGS. 6A and 6B are views for describing an arrangement structure of an optical member according to the embodiment of the present invention.
Figure 7:
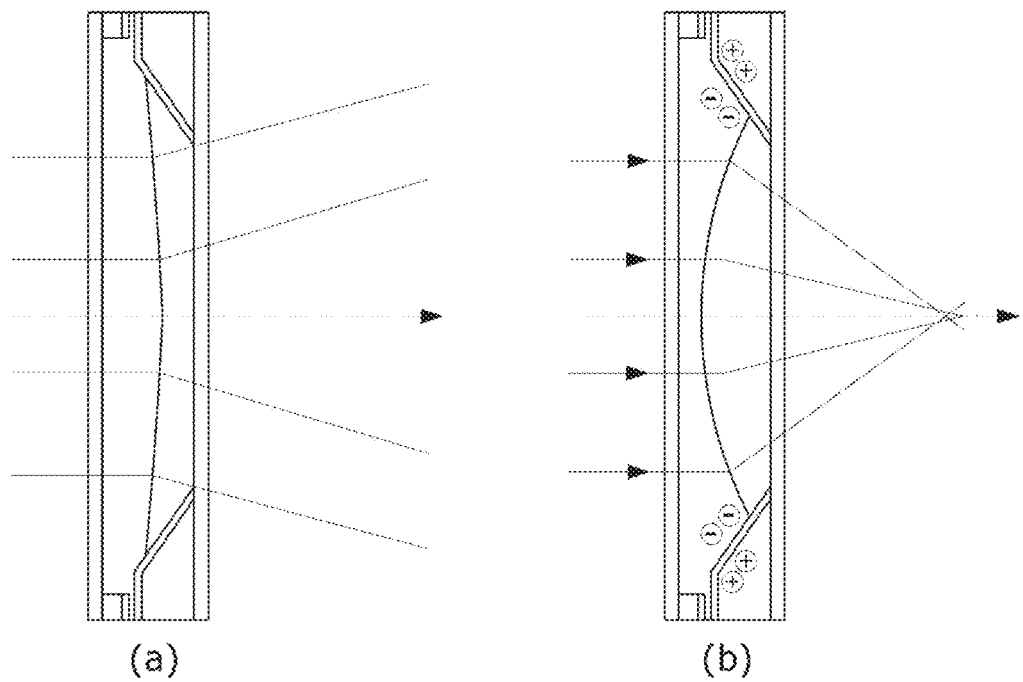
FIGS. 7A and 7B are views for describing a liquid lens based on electrowetting according to the embodiment of the present invention.
Figure 8:
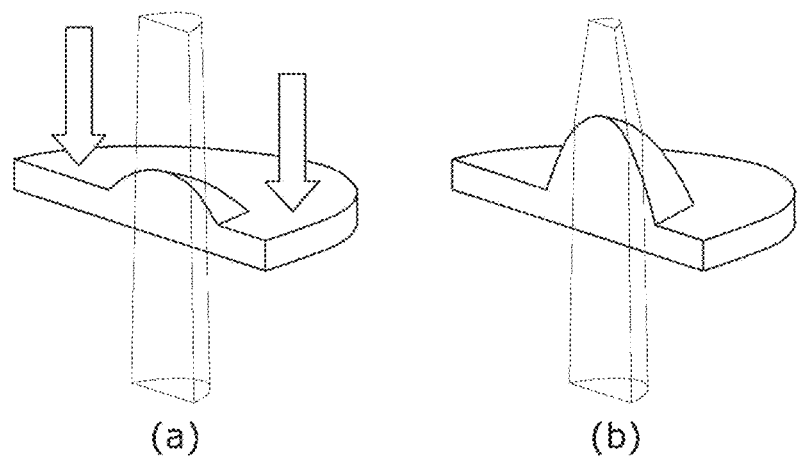
FIGS. 8A and 8B are views for describing a liquid lens based on a shape changing polymer according to the embodiment of the present invention.

Although the structure in which one optical member is coupled in an add-on shape or add-in shape is illustrated in FIG. 6 for the convenience of description, two or more optical members may be coupled in an add-on or add-in shape.

Hereinafter, the configuration of the optical member will be described with reference to the drawings.

FIGS. 7A and 7B are views for describing a liquid lens based on electrowetting according to the embodiment of the present invention.

The liquid lens based on electrowetting may include two different liquids, a housing configured to accommodate the two liquids, and electrodes. Here, the two liquids may be a conductive liquid and a non-conductive liquid. The two liquids have different properties and refractive indices so that an interface is formed therebetween. In addition, when electricity is applied through the electrodes, a curvature of the interface changes according to the applied electricity.

For example, the curvature of the interface may be controlled such that a surface through which light is output is convex as shown in FIG. 7A or concave as shown in FIG. 7B. That is, a focal length may be changed by changing the curvature of the interface.

According to the present invention, the light pattern may be adjusted by changing the light path of the light signal through the electrowetting-based liquid lens.

FIGS. 8A and 8B are views for describing a liquid lens based on a shape changing polymer according to the embodiment of the present invention.

The liquid lens based on a shape changing polymer may have a form filled with a liquid in a membrane. In the liquid lens based on a shape changing polymer, the shape of the membrane filled with a liquid may be convex, flattened, or concave depending on voltage applied to an actuator connected to a ring surrounding an edge of the liquid-filled membrane.

For example, in the liquid lens based on a shape changing polymer illustrated in FIG. 8A, when pressure is applied to the edge of the lens due to the ring surrounding the edge, a central portion of the liquid lens based on a shape changing polymer may be convex as shown in FIG. 8B. Accordingly, it can be seen that a focal length is smaller in FIG. 8B than in FIG. 8A.

According to the present invention, the light pattern may be adjusted by changing the light path of the light signal through the shape changing polymer-based liquid lens.

Figure 9:
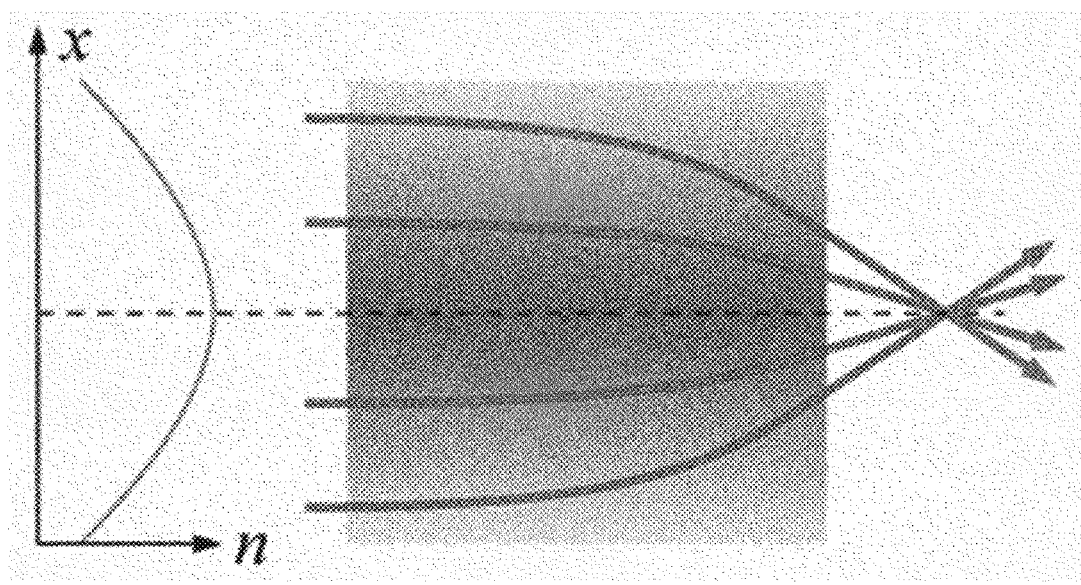

FIG. 9 and FIGS. 10A and 10B are views for describing a refractive index lens according to the embodiment of the present invention.

FIG. 9 illustrates the principle of a gradient index lens (GRIN lens), which is a kind of refractive index lens. As illustrated in FIG. 9, the GRIN lens is a lens to which a constant refractive index distribution is applied by using the principle of forming an image using a phenomenon in which the path of a light ray is gradually changed in a medium whose refractive index is continuously changed. Here, the GRIN lens may have different refractive indices depending on a position as well as a gradient constant.

As shown in FIGS. 10A and 10B, the GRIN lens may have different types or structures of liquid crystals. As shown in FIG. 10A, when nematic liquid crystals are used, liquid crystal molecules are rearranged in an electric field direction, thereby controlling the refractive index. As another example, as shown in FIG. 10B, when ferroelectric liquid crystals are used, liquid crystal molecules are rearranged by rotating around a constant cone angle, thereby controlling the refractive index. As shown in FIG. 10B, in the GRIN lens, a polymer structure may be disposed between glasses according to the required light-gathering power.

In the refractive index lens, the light path of the light signal passing through the refractive index lens may be changed by changing the arrangement of the liquid crystals. Thus, the light pattern of the light signal may be adjusted.

Figure 11:
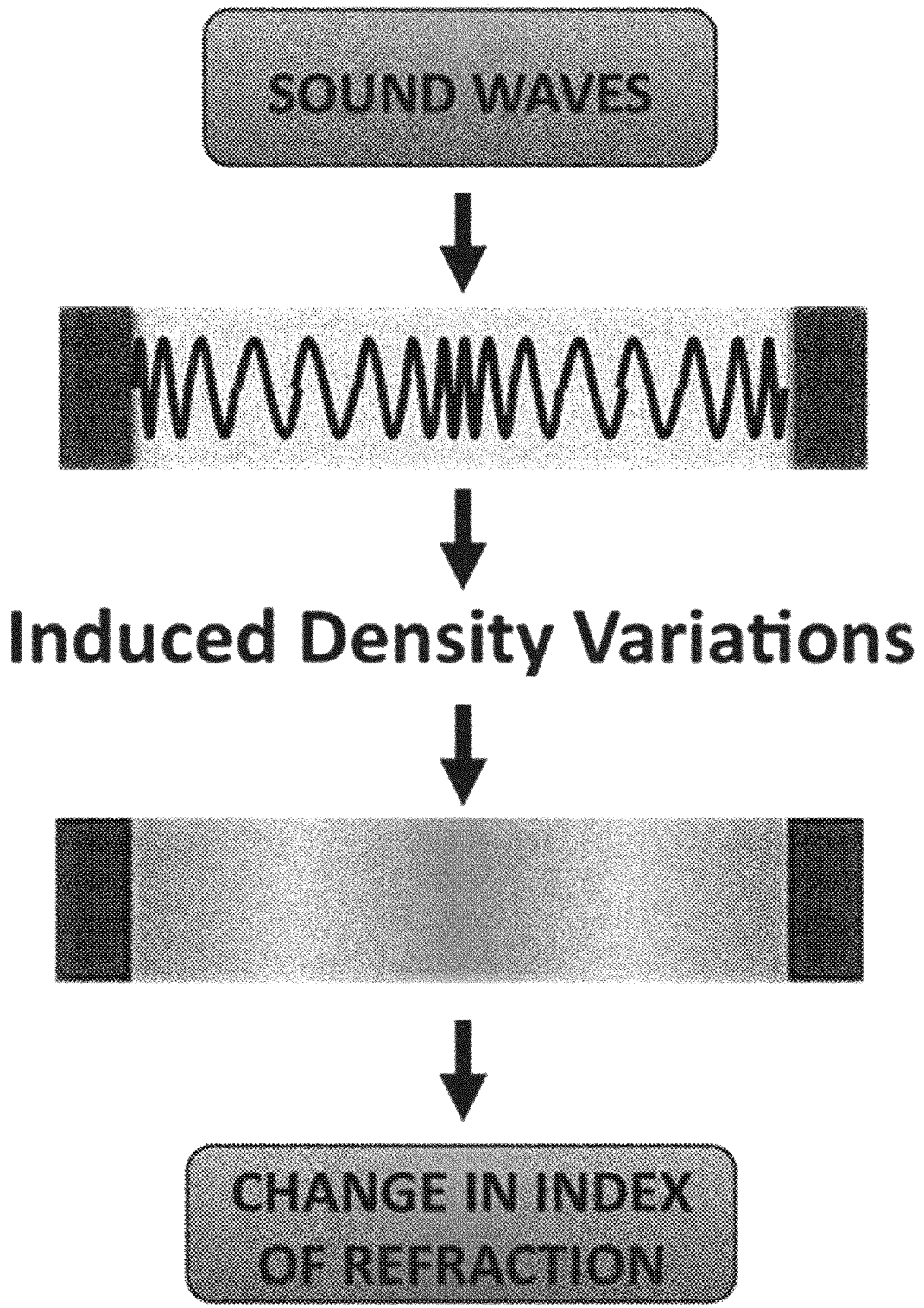
FIG. 11 is a view for describing an acoustic lens according to the embodiment of the present invention.
Figure 14:
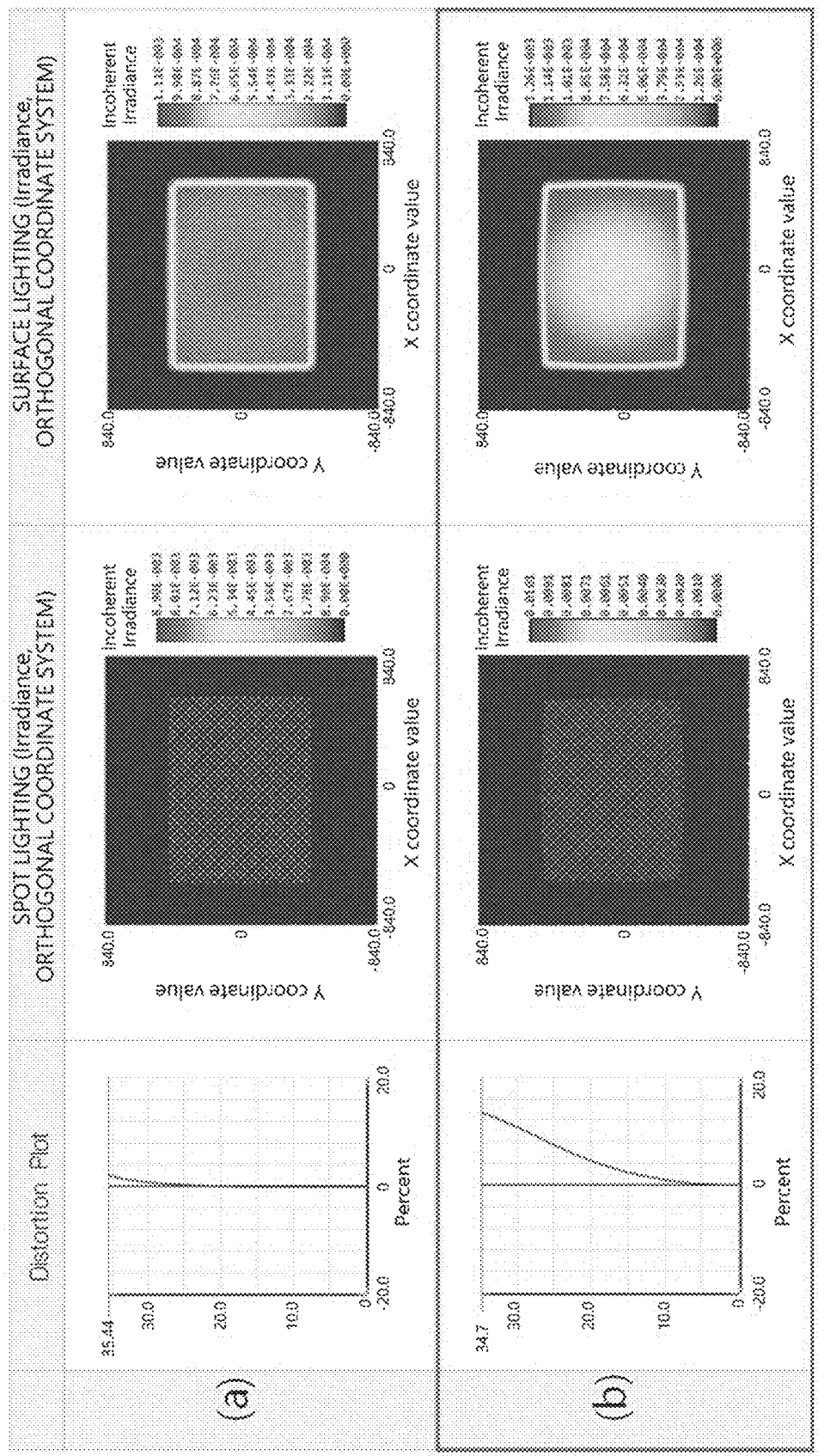
Figure 15:
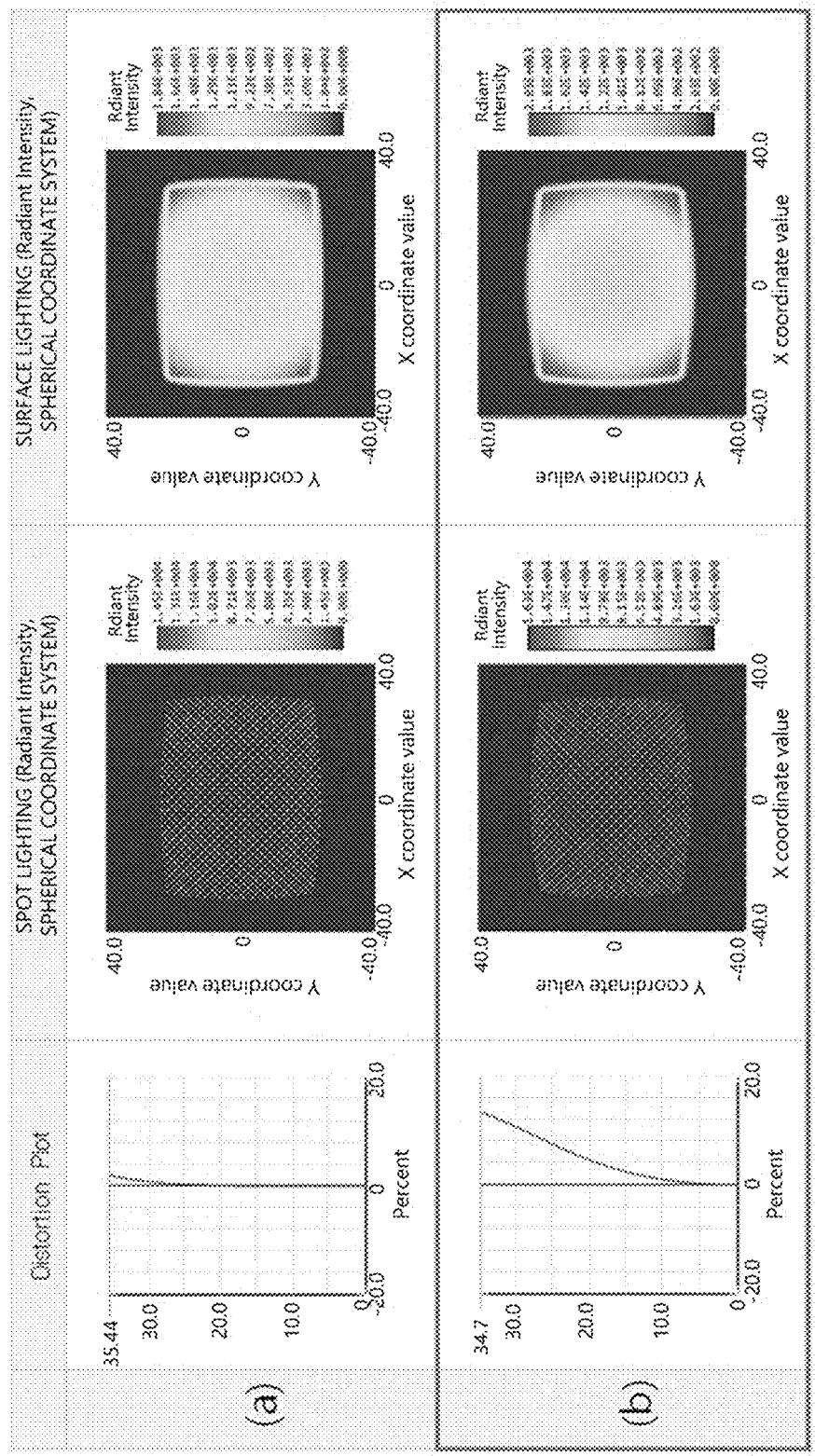

FIG. 11 is a view for describing an acoustic lens according to the embodiment of the present invention.

Referring to FIG. 11, the acoustic lens is implemented through a mechanism in which waves refract at an interface of different mediums. These characteristics may also be applied to light and light waves because the light and the light waves also have wave properties. When the acoustic lens is exposed to sound waves, a medium of the lens is changed according to the sound waves, and the refractive index may be changed accordingly. Thus, the light pattern of the light signal may be adjusted.

As described above with reference to FIGS. 4 to 11, the camera module 10 according to the embodiment of the present invention may change the light pattern of the light signal from a planar light source to a point light source or change a resolution of the point light source according to a resolution of the light signal, a distance to the object, a degree of power consumption, and the like, thereby flexibly coping with the requirements of various applications.

Hereinafter, the distortion aberration of the lens unit 120 will be described with reference to FIGS. 12 to 15.

Aberrations refer to phenomena in which light from one point does not converge into a single point after passing through an optical system and thus an image is distorted when an image is formed. The aberrations are largely classified into monochromatic aberrations and chromatic aberrations. Here, the monochromatic aberrations are caused by a geometric shape of a lens and include spherical, coma, astigmatism, field curvature, and distortion aberrations.

Among these, the distortion aberration refers to a phenomenon in which an object with a flat surface perpendicular to an optical axis is not imaged in a different shape on an image surface perpendicular to the optical axis. The distortion aberration may be an aberration that represents a defect in shape reproducibility of an image. The form of the distortion aberration may be classified into barrel distortion and pincushion distortion that may be referred to as negative distortion and positive distortion, respectively.

The distortion aberration may be expressed as a percentage of an ideal height of an image with respect to a distance deviated from an ideal position of the image. This may be represented by Equation 1 below, $$\text{Distortion (\%)} = \frac{y_{real} - y_{paraxial}}{y_{paraxial}} \times 100 \qquad [\text{Equation 1}]$$

where Distortion (%) represents a distortion rate, $y_{real}$ represents a changed position of an image, and $y_{paraxial}$ represents an ideal position of the image. That is, $y_{real}$ refers to a distorted position of the image, and $y_{paraxial}$ refers to a position of the image in an undistorted case.

When the distortion aberration exists, distortion occurs in a projected image in the case of an imaging device such as a projector. In addition, the distortion occurs in a captured image in the case of an image-capturing device such as a camera. In order to solve these problems, a device such as a projector or camera uses a lens with the minimized distortion aberration, or the distortion aberration is minimized through image correction. In general, a lens having a distortion aberration of 3% or less is used.

FIGS. 12A and 12B are views for describing the lens unit to which distortion aberration is applied according to the embodiment of the present invention.

FIG. 12A illustrates fields on a side surface of the lens unit 120, and FIG. 12B illustrates fields on a side surface of the object.

The light-emitting unit 100 according to the embodiment of the present invention uses the lens unit 120 to which intentional distortion aberration is applied. Preset distortion aberration may be applied to the lens unit 120 according to the embodiment of the present invention for each field. That is, in the case in which the lens unit 120 may be divided into ten fields, the distortion aberration may be set for each of the ten fields, and the set distortion aberration may be applied for each field. The distortion aberration set for each field may be different from the others or some of the distortion aberration may be the same.

For example, it is assumed that field of illumination (FOI) of the light-emitting unit 100 is 70°. The FOI refers to a viewing angle with respect to the light-emitting unit 100, which may correspond to a field-of-view (FOV) of the light-receiving unit 200. The viewing angle may be set with respect to an opposite angle but may also be set with respect to a horizontal angle or vertical angle.

Here, as shown in FIG. 12, when the fields are divided into seven fields, a difference of 7° may occur between each field and an adjacent field. When the seven fields are divided into fields from a 0th field to a sixth field, the preset distortion aberration may be applied to each of the 0th to 6th fields. That is, in the lens unit 120, 0th to 6th distortion aberrations may be applied to the 0th to 6th fields, respectively. In addition, light signals distorted according to the 0th to 6th distortion aberrations may be incident on the 0th to 6th fields of the object, respectively.

According to the embodiment of the present invention, a magnitude of the distortion rate may be set to 5% or more in a range greater than a half angle of the FOI. Here, the half angle of the FOI may refer to an angle corresponding to half of the FOI. For example, when the FOI is 70°, the half angle of the FOI may refer to 35°. Thus, in this case, the magnitude of the distortion rate may be set to be 5% or more in the case in which the FOI is 35°. Thus, the effective focal length of the lens unit 120 and the size of the light source unit 110 may be determined, which may be expressed as Equation 2 below, $$\tan \theta 2 = L \tan(\theta/2) = L/(2 \times EFL) \quad \text{[Equation 2]}$$

where θ refers to the FOI, EFL refers to the effective focal length of the lens unit 120, and L refers to an opposite angle length of the light source unit 110. According to one embodiment, the opposite angle length of the light source unit 110 may mean a distance between vertical cavity surface-emitting lasers (VCSELs) disposed in an opposite angle direction among the VCSELs included in the light source unit.

For example, when the FOI is 35°, the effective focal length of the lens unit 120 and the opposite angle length of the light source unit 110 may have a relationship as shown in Equation 3 below, $$\tan 35° = \frac{L}{2 \times EFL} \quad \text{[Equation 3]}$$

The distortion aberration may monotonically increase from the central portion of the lens unit 120 to the half angle of the FOI. In the distortion aberration from the central portion of the lens unit 120 to the half angle of the FOI, the magnitude of the distortion rate may monotonically increase for each field. For example, when the half angle of the lens unit 120 is included in the 3rd field, the magnitude of the distortion rate may monotonically increase from the 0th field, in which the central portion of the lens unit 120 is included, to the 3rd field.

Meanwhile, the magnitude of the distortion rate may be maintained or decreased in the distortion aberration in a range greater than the half angle of the lens unit 120. In the above example, when it is assumed that the lens unit 120 is divided up to the 6th field, the magnitude of the distortion rate in each of the 4th to 6th fields may be greater than that in the 3rd field.

According to the embodiment of the present invention, the lens unit 120 may distort the light signal such that the light pattern has the form of barrel distortion corresponding to the distortion aberration. Thus, the light pattern of the light signal incident on the object may have the form of barrel distortion.

FIGS. 13A and 13B are diagrams for describing signs of the distortion aberration according to the embodiment of the present invention.

First, the configuration of the lens unit illustrated in FIGS. 13A and 13B will be described.

The lens unit according to one embodiment of the present invention may include a first lens, a second lens, a third lens, and a fourth lens that are sequentially disposed from a light source side to an object side. An aperture may be disposed between the third lens and the fourth lens.

The first lens may be a single lens or a combined lens in which a plurality of lenses are combined. The first lens may have a positive (+) power.

The first lens may be a single lens. A light-source-side surface of the first lens may be a flat surface. An object-side surface of the first lens in a light source direction may be concave.

The first lens may be a combined lens in which a plurality of lenses are combined. The first lens may be a combined lens in which three lenses are combined. The first lens may be a combined lens in which first-first to first-third lenses sequentially disposed from the light source side to the object side are combined. A light-source-side surface of the first-first lens may be a flat surface. An object-side surface of the first-first lens in the light source direction may be convex. A light-source-side surface of the first-second lens in the light source direction may be concave. An object-side surface of the first-second lens may be a flat surface. A light-source-side surface of the first-third lens may be a flat surface. An object-side surface of the first-third lens in the light source direction may be concave.

The second lens may be a single lens or a combined lens in which a plurality of lenses are combined. The second lens may have a positive (+) power.

The second lens may be a single lens. A light-source-side surface of the second lens in the light source direction may be convex. An object-side surface of the second lens may be a flat surface.

The second lens may be a combined lens in which a plurality of lenses are combined. The second lens may be a combined lens in which three lenses are combined. The second lens may be a combined lens in which second-first to second-third lenses sequentially disposed from the light source side to the object side are combined. A light-sourceside surface of the second-first lens in the light source direction may be convex. An object-side surface of the second-first lens may be a flat surface. A light-source-side surface of the second-second lens may be a flat surface. An object-side surface of the second-second lens in the light source direction may be convex. A light-source-side surface of the second-third lens in the light source direction may be convex. An object-side surface of the second-third lens may be a flat surface.

The third lens may be a single lens or a combined lens in which a plurality of lenses are combined. The third lens may have a positive (+) power.

The third lens may be a single lens. A light-source-side surface of the third lens in the light source direction may be convex. An object-side surface of the third lens may be a flat surface.

The third lens may be a combined lens in which a plurality of lenses are combined. The third lens may be a combined lens in which three lenses are combined. The third lens may be a combined lens in which third-first to third-third lenses sequentially disposed from the light source side to the object side are combined. A light-source-side surface of the third-first lens in the light source direction may be convex. An object-side surface of the third-first lens may be a flat surface. A light-source-side surface of the third-second lens may be a flat surface. An object-side surface of the third-second lens in the light source direction may be convex. A light-source-side surface of the third-third lens in the light source direction may be convex. An object-side surface of the third-third lens may be a flat surface.

The fourth lens may be a single lens or a combined lens in which a plurality of lenses are combined. The fourth lens may have a positive (+) power.

The fourth lens may be a single lens. A light-source-side surface of the fourth lens may be a flat surface. An object-side surface of the fourth lens in the light source direction may be concave.

The fourth lens may include three lenses. The fourth lens may be a combined lens in which fourth-first to fourth-third lenses sequentially disposed from the light source side to the object side are combined. A light-source-side surface of the fourth-first lens may be a flat surface. An object-side surface of the fourth-first lens in the light source direction may be concave. A light-source-side surface of the fourth-second lens in the light source direction may be concave. An object-side surface of the fourth-second lens may be a flat surface. A light-source-side surface of the fourth-third lens may be a flat surface. An object-side surface of the fourth-third lens in the light source direction may be concave.

The surface lighting and the spot lighting may be adjusted according to the distance between a focus of the lens unit and an upper surface of the light source unit 110. According to one embodiment, the light-emitting unit may output a light pattern close to the spot lighting as a back focus of the lens unit is closer to the upper surface of the light source unit 110, and output a light pattern close to the surface lighting as the back focus of the lens unit is far away from the upper surface of the light source unit 110. According to one embodiment, when the back focus of the lens unit coincides with the upper surface of the light source unit 110, the spot lighting including the smallest sized spots may be output.

According to the embodiment of the present invention, the distortion aberration applied to the lens unit 120 may have signs corresponding to those of the barrel distortion.

FIG. 13A illustrates a case in which the light-emitting unit 100 is disposed in the same direction as the light-receiving unit 200. The case in which the light-emitting unit 100 is disposed in the same direction as the light-receiving unit 200 may mean that the light-emitting unit 100 is disposed in the same direction as the light-receiving unit 200 on the basis of the object. For example, when it is assumed that a front surface of the object is in a first direction and a rear surface of the object is in a second direction, it may mean that both the light-emitting unit 100 and the light-receiving unit 200 are disposed in the first direction or in the second direction. For example, when the light-emitting unit 100 and the light-receiving unit 200 are disposed on the same substrate, it can be seen that the light-emitting unit 100 is disposed in the same direction as the light-receiving unit 200. According to the embodiment of the present invention, when the light-emitting unit 100 is disposed in the same direction as the light-receiving unit 200, the distortion aberration may have a positive sign. When the distortion aberration has a positive sign, the light pattern of the light-emitting unit 100 may have the form of barrel distortion. When the distortion aberration has a negative sign, the light pattern of the light-emitting unit 100 may have the form of pincushion distortion.

Referring to FIG. 13A, it can be seen that a distortion rate of the light pattern of the light-emitting unit 100 increases in a direction from a central portion to an end portion. For example, it can be seen that, when the FOI is 70°, the distortion rate is within 1% at points of about 0° (the central portion of the lens unit) to 10° (a point of ⅐ of the viewing angle of the lens unit), is 4% or more and 10% or less at a point of 20° (a point of 2/7 of the viewing angle of the lens unit), and is 10% or more and 20% or less at a point of 30° (a point of 3/7 of the viewing angle of the lens unit). It can be seen that the increase rate of the distortion rate increases after 20°, and at a point of 35° (that is, a half-angle point of the viewing angle of the lens unit), the distortion rate is 13% or more and 20% or less. As described above, the distortion rate of the light pattern of the light-emitting unit 100 is not significantly changed from the central portion to a predetermined distance point, but increases after the predetermined distance point. Accordingly, even when all pixels of the light-emitting unit output light with the same optical power, the intensity of light of an outer region increases according to the distortion rate so that the light loss generated in the peripheral portion of the light pattern may be compensated.

FIG. 13B illustrates a case in which the light-emitting unit 100 is disposed in the same direction as the object. The case in which the light-emitting unit 100 is disposed in the same direction as the object may mean that the light-emitting unit 100 is disposed in the same direction as the object on the basis of the light-receiving unit 200. For example, when it is assumed that a front surface of the light-receiving unit 200 is in the first direction and a rear surface of the light-receiving unit 200 is in the second direction, it may mean that both the light-emitting unit 100 and the object are disposed in the first direction or in the second direction. In this case, the light-emitting unit 100 and the light-receiving unit 200 may be disposed to be separated from each other. According to the embodiment of the present invention, when the light-emitting unit 100 is disposed in the same direction as the object, the distortion aberration may have a negative sign. When the distortion aberration has a negative sign, the light pattern of the light-emitting unit 100 may have the form of barrel distortion. When the distortion aberration has a negative sign, the light pattern of the light-emitting unit 100 may have the form of pincushion distortion.

Referring to FIG. 13B, it can be seen that the distortion rate of the light pattern of the light-emitting unit 100 increases in a direction from a central portion to an end portion. It can be seen that the distortion rate is within −1% at a point of 10°, and is within −4% at points up to 30°. It can be seen that the increase rate of the distortion rate increases after 20°, and at a point of 75°, the distortion rate is −12%. As described above, the distortion rate of the light pattern of the light-emitting unit 100 is not significantly changed from the central portion to the predetermined distance point, but increases after the predetermined distance point. Accordingly, even when all pixels of the light-emitting unit output light with the same optical power, the intensity of light of an outer region increases according to the distortion rate so that the light loss generated in the peripheral portion of the light pattern may be compensated.

FIGS. 14A to 15B are diagrams illustrating simulation results of a surface lighting according to the embodiment of the present invention.

FIGS. 14A and 15A and FIGS. 14B and 15B respectively illustrate a case in which the distortion aberration is not applied and a case in which the distortion aberration is applied according to the embodiment of the present invention. At this point, the case in which the distortion aberration is not applied may mean a case of using a commonly used lens with the minimal distortion aberration. For example, it may be the case that a lens having a distortion aberration less than 3% is used.

FIGS. 14A and 14B illustrate simulation results obtained in an orthogonal coordinate system, and FIGS. 15A and 15B illustrate simulation results obtained in a spherical coordinate system. FIGS. 14A and 15A illustrate simulation results in the case in which the distortion aberration is not applied for each field. FIGS. 14B and 15B illustrate simulation results of the present invention in the case in which the distortion aberration is applied for each field.

First, the case in which the distortion aberration is not applied for each field will be described. In the graphs of FIGS. 14A and 15A illustrating the distortion aberration, it can be seen that, for example, when the FOI is 70°, the distortion rate is within 1% at points of about 0° (the central portion of the lens unit) to 10°, is more than 4% at a point of 20°, and is more than 10% at a point of 30°. It can be seen that the increase rate of the distortion rate increases after 20°, and at a point of 35° (that is, the half-angle point of the viewing angle of the lens unit), the distortion rate is more than 13%. This also appears in irradiated lighting. It can be seen that, in both the orthogonal coordinate system and the spherical coordinate system, the distance between each spot is almost constant for the spot lighting. In addition, it is confirmed that almost uniform light intensity (irradiance or radiation intensity) appears throughout the surface lighting.

On the other hand, referring to a case in which the distortion aberration is applied for each field as in FIGS. 14B and 15B, it can be seen that, in the graphs illustrating the distortion aberration, for example, when the FOI is 70°, the distortion rate is within 1% at points of about 0° (the central portion of the lens unit) to 10°, is more than 4% at a point of 20°, and is more than 10% at a point of 30°. It can be seen that the increase rate of the distortion rate increases after 20°, and at a point of 35° (that is, a half-angle point of the viewing angle of the lens unit), the distortion rate is more than 13%. This also appears in irradiated lighting. It can be seen that, in the spot lighting, the closer to a central portion, the greater spaced distance between spots is. It can be seen that, in the surface lighting, the closer to a central portion of the lighting, the smaller the intensity of light (irradiance or radiation intensity) is. It can be seen that, in the orthogonal coordinate system, the surface lighting has an incoherent irradiance of $1.01E^{-003}$ W/cm$^2$ at a point in which a distance from the central portion is 400 mm, and has an incoherent irradiance in a range of $1.14E^{-003}$ to $1.26E^{-003}$ W/cm$^2$ at points in which the distance is greater than 400 mm. It can be seen that, in the spherical coordinate system, the surface lighting has a radiant intensity of $1.42E^{+003}$ W/sr from the central portion to a point of 24°, and has a radiant intensity of $1.62E^{+003}$ W/sr or more after 24°.

As described above, it can be seen that in the case of the spot lighting, the intensity of light increases as a spot density of a peripheral portion of the pattern increases, and in the case of the surface lighting, the intensity of light of a peripheral portion of the pattern increases. That is, in the case of using the lens unit 120 to which the distortion aberration is applied according to the embodiment of the present invention, in the pattern of light of the light signal output by the light-emitting unit 100, the intensity of light may increase as it moves away from the central portion of the pattern. As described above, light loss in the peripheral portion of the pattern in the light-receiving unit 200 may be compensated for by increasing the intensity of light in the peripheral portion of the pattern. Accordingly, reliability and accuracy with respect to received information may be improved by compensating for the light loss in the peripheral portion of the pattern by the light-receiving unit 200.

Hereinafter, a driving example of light-emitting devices according to one embodiment of the present invention will be described with reference to FIGS. 16 to 19.

According to the embodiment of the present invention, in the light source unit 110, a plurality of light-emitting devices may be disposed according to a predetermined rule. In addition, the light source unit 110 may drive some light-emitting devices among the plurality of light-emitting devices according to a predetermined rule.

Figure 16:
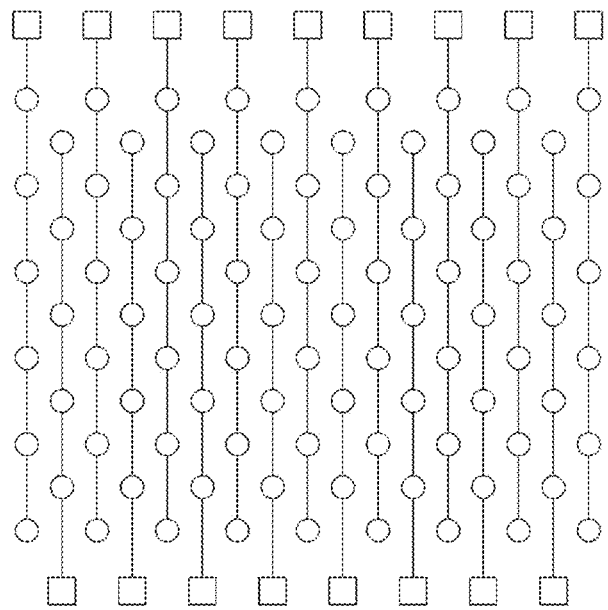
FIG. 16 is a view illustrating an arrangement and connection structure of a plurality of light-emitting devices according to one embodiment of the present invention.
Figure 17:
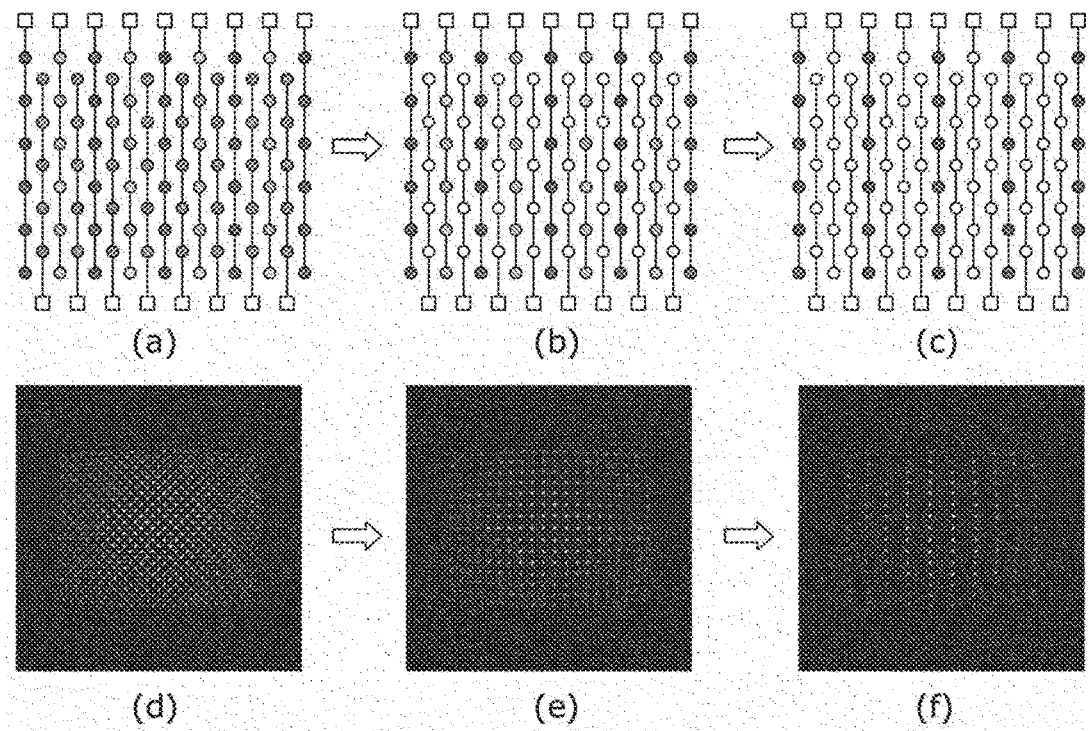
FIGS. 17A to 17F are views for describing a driving example according to the arrangement and connection structure of the light-emitting devices of FIG. 16.

FIG. 16 is a view illustrating an arrangement and connection structure of the plurality of light-emitting devices according to one embodiment of the present invention.

In FIG. 16, a circular figure represents the light-emitting device, a rectangular figure represents an electrode, and a linear figure represents a conducting wire.

As shown in FIG. 16, in the light source unit 110, the plurality of light-emitting devices may be disposed according to a predetermined rule. For example, the plurality of light-emitting devices may be disposed in a form of a diamond checkered pattern. That is, the plurality of light-emitting devices may be disposed in a form in which each corner of the checked pattern is located on upper, lower, left, and right sides.

The plurality of light-emitting devices may be disposed on a plurality of lines including first to third lines. The second line may be disposed between the first line and the third line. The first to third lines may be repeatedly disposed. Here, the term "line" may refer to a virtual straight line extending in a vertical or lateral direction.

In FIG. 16, a first vertical axis on a left side may be the first line. Since only the second line may be disposed next to the first line, a second vertical axis on the left side may be the second line. Since the second line is disposed between the first line and the third line, a third vertical axis on the left side may be the third line. Since only the second line may be disposed next to the third line, a fourth vertical axis on the left side may be the second line. Since the second line is disposed between the first line and the third line, a fifth vertical axis on the left side may be the first line. The plurality of lines may be disposed in such a manner.

Light-emitting devices disposed on one line may be connected to the same electrode. Accordingly, the light-emitting devices disposed on one line may be electrically connected to each other. For example, light-emitting devices disposed in the first line, which is the first vertical axis, may be connected to the same electrode. Light-emitting devices disposed on the first line, which is the fifth vertical axis, may be connected to an electrode different from that to which the light-emitting devices disposed on the first line, which is the first vertical axis, are connected.

FIGS. 17A to 17F are views for describing a driving example according to the arrangement and connection structure of the light-emitting devices of FIG. 16.

As illustrated in FIGS. 17A to 17F, a plurality of driving modes according to the embodiment of the present invention may include first to third driving modes.

The first driving mode may refer to a mode for driving a plurality of light-emitting devices disposed on the first line, the second line, and the third line. Thus, as illustrated in FIG. 17A, all of the light-emitting devices may be turned on. In this case, the light pattern of the light signal irradiated on the object may be represented by a spot density as shown in FIG. 17D.

The second driving mode may refer to a mode for driving a plurality of light-emitting devices disposed on the first line and the third line. Accordingly, as illustrated in FIG. 17B, only the light-emitting devices disposed on one line of two consecutive lines may be turned on. In this case, the light pattern of the light signal irradiated on the object may be represented by a spot density as shown in FIG. 17E.

The third driving mode may refer to a mode for driving a plurality of light-emitting devices disposed on the first line. Accordingly, as illustrated in FIG. 17C, only the light-emitting devices disposed on one line among four consecutive lines may be turned on. In this case, the light pattern of the light signal irradiated on the object may be represented by a spot density as shown in FIG. 17F.

Figure 18:
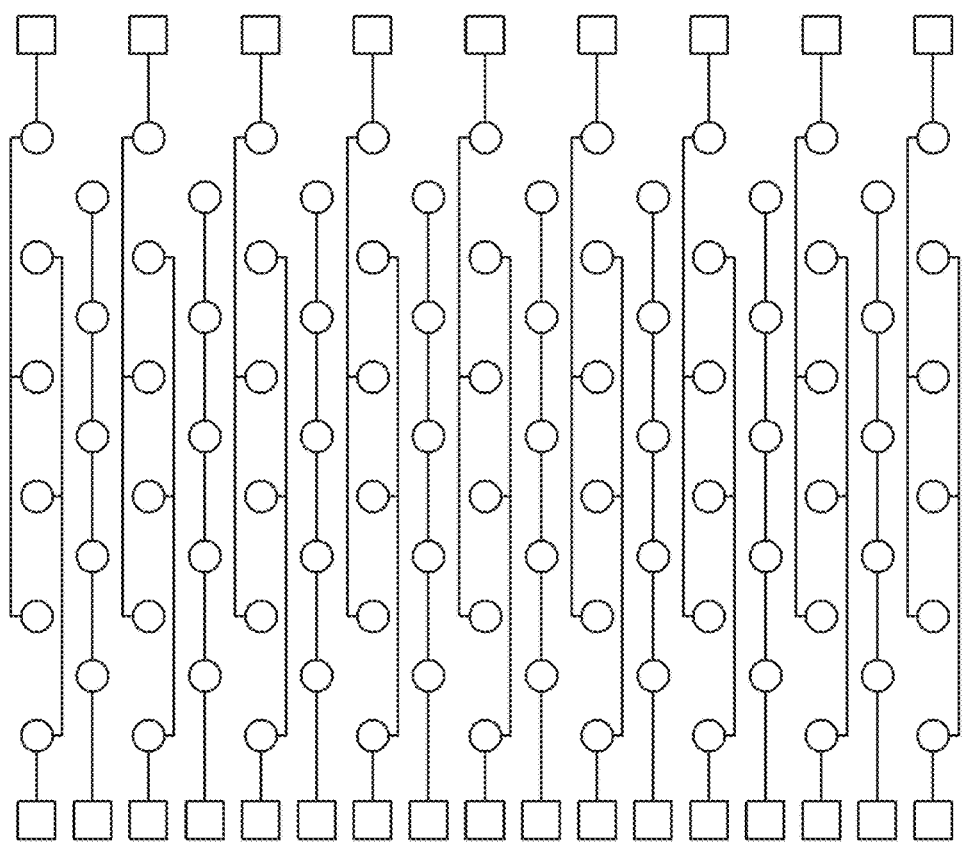
FIG. 18 is a view illustrating an arrangement and connection structure of a plurality of light-emitting devices according to another embodiment of the present invention.
Figure 19:
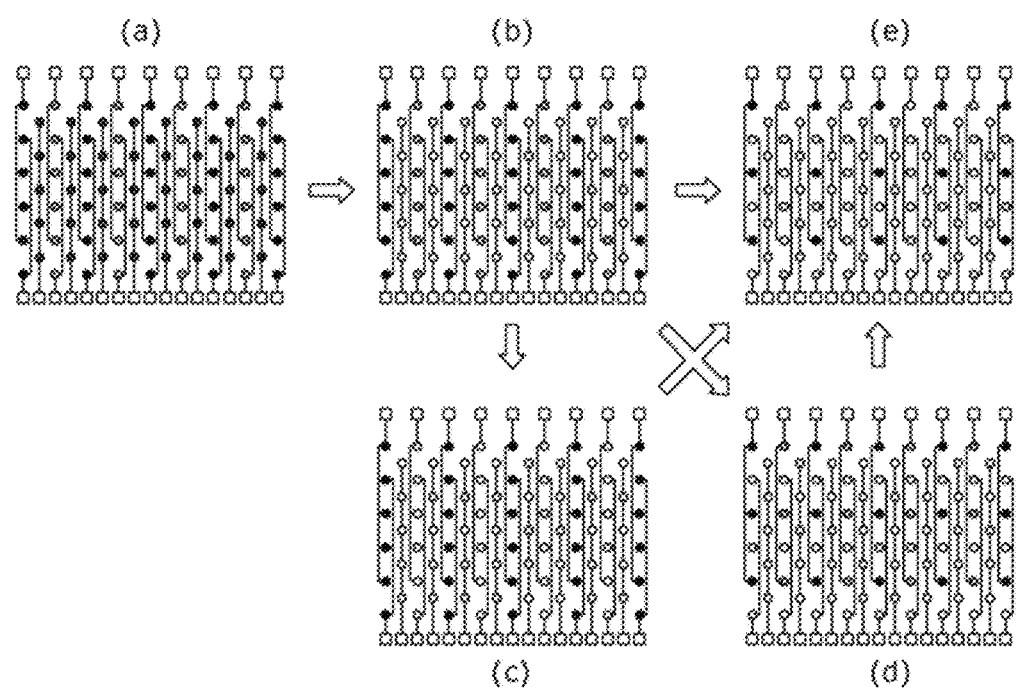
FIGS. 19A to 19E are views for describing a driving example according to the arrangement and connection structure of the light-emitting devices of FIG. 18.

FIG. 18 is a view illustrating an arrangement and connection structure of a plurality of light-emitting devices according to another embodiment of the present invention.

In FIG. 18, a circle figure represents a light-emitting device, a rectangular figure represents an electrode, and a line figure represents a conducting wire. The arrangement structure of the light-emitting devices illustrated in FIG. 18 may be the same as that described with reference to FIG. 16, and thus a detailed description thereof will be omitted. However, the connection structure of the light-emitting devices may be different.

Referring to FIG. 18, light-emitting devices adjacent to each other among a plurality of light-emitting devices disposed on a first line may be respectively connected to a first electrode and a second electrode. For example, odd-numbered light-emitting devices of the first line may be connected to the first electrode, and even-numbered light-emitting devices of the first line may be connected to the second electrode.

A plurality of light-emitting devices disposed on a second line may be connected to a third electrode.

Light-emitting devices adjacent to each other among a plurality of light-emitting devices disposed on a third line may be respectively connected to a fourth electrode and a fifth electrode. For example, odd-numbered light-emitting devices of the third line may be connected to the fourth electrode, and even-numbered light-emitting devices of the third line may be connected to the fifth electrode.

FIGS. 19A to 19E are views for describing a driving example according to the arrangement and connection structure of the light-emitting devices of FIG. 18.

As illustrated in FIGS. 19A to 19E, a plurality of driving modes according to the embodiment of the present invention may include fourth to eighth driving modes.

The fourth driving mode may refer to a mode for driving a plurality of light-emitting devices connected to first to fifth electrodes. Thus, as illustrated in FIG. 19A, all of the light-emitting devices may be turned on.

The fifth driving mode may refer to a mode for driving a plurality of light-emitting devices connected to the first, second, fourth, and fifth electrodes. Accordingly, as illustrated in FIG. 19B, only the light-emitting devices disposed on one line of two consecutive lines may be turned on.

The sixth driving mode may refer to a mode for driving a plurality of light-emitting devices connected to the first and second electrodes. Accordingly, as illustrated in FIG. 19C, only the light-emitting devices disposed on one line among four consecutive lines may be turned on.

The seventh driving mode may refer to a mode for driving a plurality of light-emitting devices connected to the first and fourth electrodes. Accordingly, as illustrated in FIG. 19D, only odd-numbered or even-numbered light-emitting devices among the light-emitting devices disposed on one line of two consecutive lines may be turned on. As another example, the seventh driving mode may refer to a mode for driving a plurality of light-emitting devices connected to the second and fifth electrodes.

The eighth driving mode may refer to a mode for driving a plurality of light-emitting devices connected to the first electrode. Accordingly, as illustrated in FIG. 19E, only odd-numbered or even-numbered light-emitting devices among the light-emitting devices disposed on one line of four consecutive lines may be turned on. As another example, the eighth driving mode may refer to a mode for driving a plurality of light-emitting devices connected to one electrode among the second, fourth, and fifth electrodes.

As described above with reference to FIGS. 16 to 19, the spot density may be changed by turning on the entire light-emitting devices or turning on some light-emitting devices according to the driving mode. In addition, the amount of light of the surface lighting may be changed by adjusting the pattern. Thus, according to the present invention, light sources may be controlled adaptively according to purposes and situations by increasing the density (light amount) in situations requiring high resolution and decreasing the density (light amount) in situations requiring relatively low resolution. In addition, through this, power consumption may be efficiently controlled.

Figure 20:
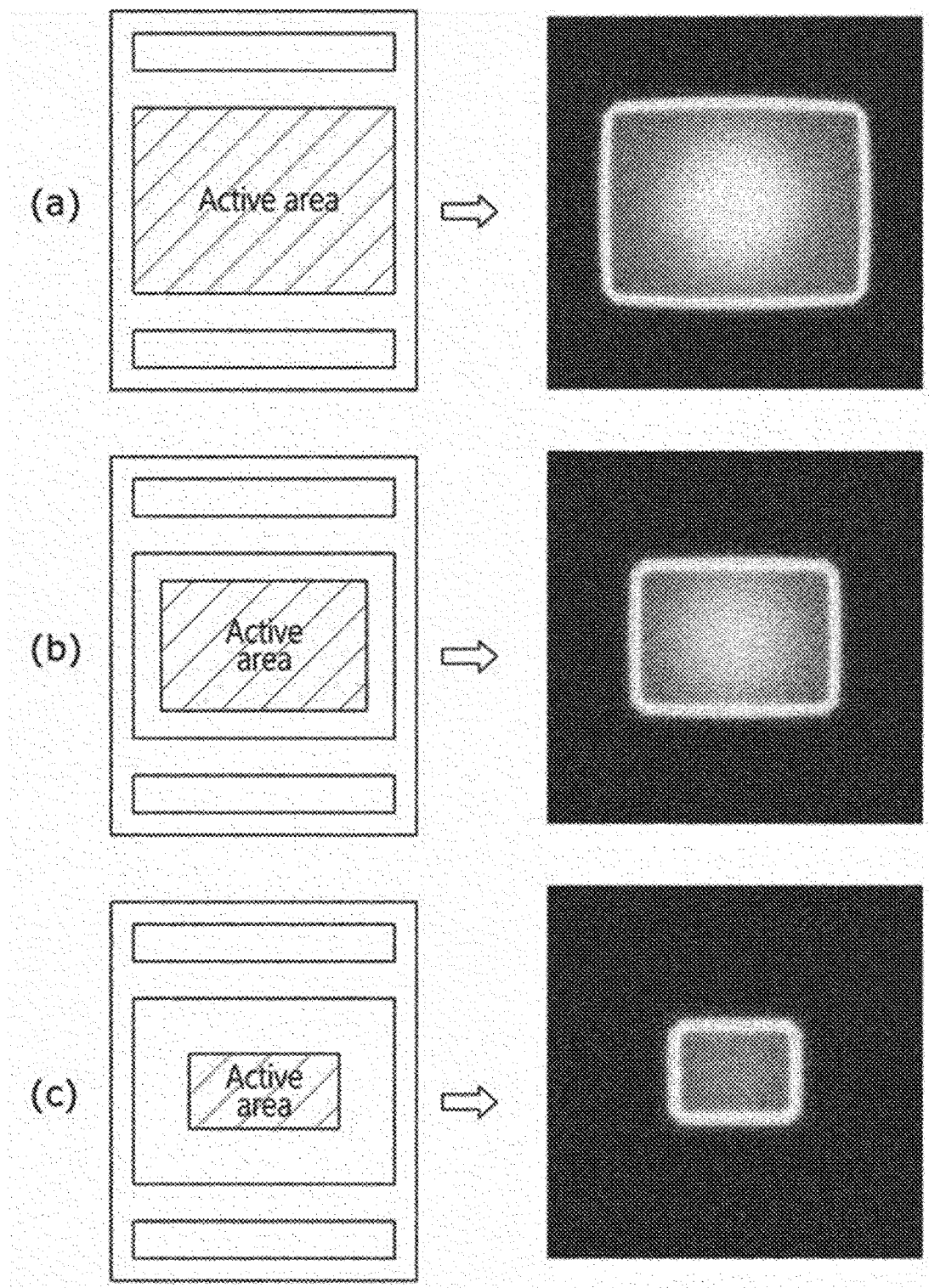
FIGS. 20A to 20C are views illustrating one embodiment of driving a partial region by a light source unit according to the embodiment of the present invention.
Figure 21:
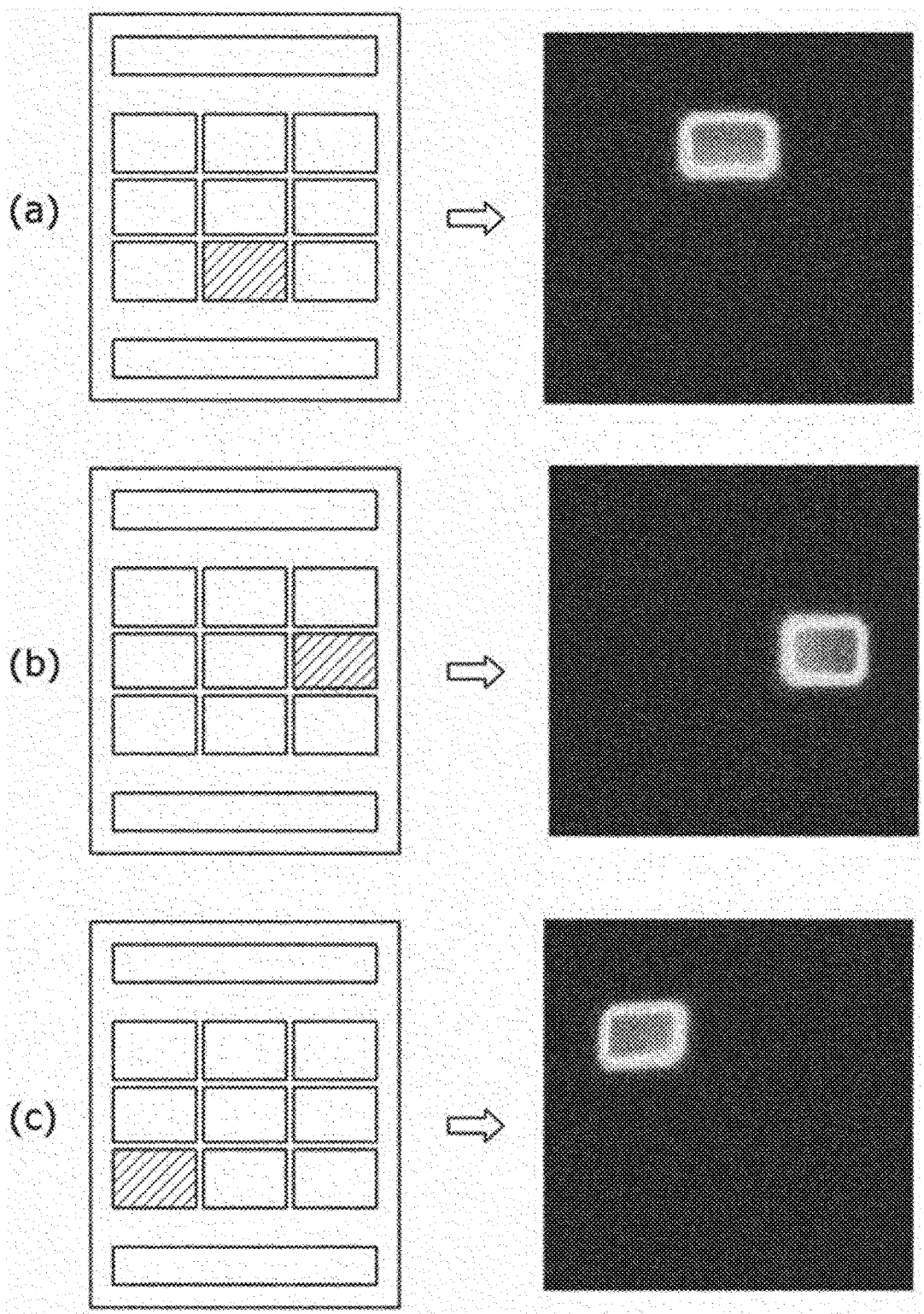
FIGS. 21A to 21C are views illustrating another embodiment of driving a partial region by the light source unit according to the embodiment of the present invention.

Hereinafter, a driving example of light-emitting devices according to another embodiment of the present invention will be described with reference to FIGS. 20 and 21.

A light source unit 110 according to the embodiment of the present invention may drive light-emitting devices disposed on a partial region of an entire region in which a plurality of light-emitting devices are disposed. Here, the light source unit 110 may be divided into 3×3, 4×3, 3×4, 4×4, 5×3, 3×5, 5×4, 4×5, and 5×5 groups and may drive light-emitting devices corresponding to one or more groups of a plurality of groups.

FIGS. 20A to 20C are views illustrating one embodiment of driving a partial region by a light source unit according to the embodiment of the present invention.

Referring to FIGS. 20A to 20C, the light source unit 110 may drive a plurality of light-emitting devices disposed within a predetermined distance from the center.

FIG. 20A illustrates an example in which light-emitting devices are driven in the entire region. FIG. 20B illustrates an example in which a plurality of light-emitting devices disposed within a predetermined distance from a central portion of the entire region are driven. FIG. 20C illustrates an example in which a plurality of light-emitting devices disposed within a predetermined distance from the central portion of the entire region are driven. The predetermined distance in FIG. 20C may be less than the predetermined distance in FIG. 20B.

FIGS. 21A to 21C are views illustrating another embodiment of driving a partial region by the light source unit according to the embodiment of the present invention.

Referring to FIGS. 21A to 21C, the light source unit 110 may be divided into a plurality of areas. For example, as shown in FIGS. 21A to 21C, the entire region may be divided into nine areas. Each area may be a group or may include a plurality of groups.

The light source unit 110 may drive a plurality of light-emitting devices disposed in at least one area among the plurality of areas. The case in which the light-emitting devices disposed in one area are driven is illustrated in FIG. 21 as an example, but light-emitting device disposed in two or more areas may also be driven.

As described above with reference to FIGS. 20 and 21, according to the embodiment of the present invention, the light source unit 110 may drive only the light-emitting devices disposed in a partial region to locally output the light signal. When a size of an object to be captured is small, the light signal may be locally output according to the size of the object, thereby reducing power consumption.

Although the embodiments have been described above, the embodiments are merely examples and not intended to limit the present invention, and it may be seen that a variety of modifications and applications not described above may be made by one of ordinary skill in the art without departing from the essential features of the embodiments. For example, the elements described in the embodiments may be realized while being modified. Further, differences related to the modifications and the applications should be included in the scope of the present invention as defined in the claims.

The invention claimed is:

1. A time of flight (ToF) camera comprising:
a light source unit including an infrared light-emitting device array and configured to generate a light signal;
a lens unit disposed on the light source unit and including a plurality of lenses; and
an adjustment unit configured to adjust the lens unit such that a light pattern of the light signal, which has passed through the lens unit, becomes a surface lighting or a spot lighting including a plurality of spot patterns,
wherein the lens unit is configured to have a preset and controllable distortion aberration in a form of barrel distortion in which irradiance of the light pattern decreases in a direction away from a central portion.

2. The ToF camera of claim 1, wherein the adjustment unit adjusts the light pattern of the light signal by changing a light path of the light signal.

3. The ToF camera of claim 1, wherein the adjustment unit includes a driving member and moves the lens unit using the driving member to change a distance between the light source unit and the lens unit.

4. The ToF camera of claim 3, wherein
when a back focus of the lens unit is away from the light source unit, the light pattern of the light signal becomes the surface lighting, and
when the back focus of the lens unit is closer to the light source unit, the light pattern of the light signal becomes the spot lighting.

5. The ToF camera of claim 1, wherein the adjustment unit includes an optical member configured to change a refractive index and changes the refractive index according to a signal applied to the optical member.

6. The ToF camera of claim 1, wherein the lens unit has an effective focal length greater than or equal to 0.4 mm and less than or equal to 2 mm.

7. The ToF camera of claim 1, wherein the distortion aberration has signs corresponding to those of the barrel distortion and has a magnitude of a distortion rate of 5% or more and 20% or less at a half-angle point of a viewing angle of the lens unit.

8. The ToF camera of claim 1, wherein a magnitude of a distortion rate monotonically increases from a central portion of the lens unit to a half-angle point of a viewing angle of the lens unit for each field.

9. The ToF camera of claim 1, wherein the distortion aberration has a magnitude of a distortion rate not more than 1% at a point of 1/7 of a viewing angle of the lens unit.

10. The ToF camera of claim 1, wherein the distortion aberration has a magnitude of a distortion rate of 4% or more and 10% or less at a point of 2/7 of a viewing angle of the lens unit.

11. The ToF camera of claim 1, wherein the distortion aberration has a magnitude of a distortion rate of 10% or more and 20% or less at a point of 3/7 of a viewing angle of the lens unit.

12. The ToF camera of claim 1, wherein the distortion aberration has a magnitude of a distortion rate of 13% or more and 20% or less at a half-angle point of a viewing angle of the lens unit.

13. The ToF camera of claim 1, wherein a viewing angle of the lens unit has one value between 69° to 80°.

14. The ToF camera of claim 1, wherein the light source unit drives at least one of a plurality of light-emitting devices according to a plurality of driving modes set to correspond to different spot densities.

* * * * *